US012769814B2

(12) United States Patent
Liu

(10) Patent No.: US 12,769,814 B2
(45) Date of Patent: Oct. 20, 2026

(54) METHODS, SYSTEMS, APPARATUSES, AND DEVICES FOR FACILITATING SELF-OPTIMIZABLE BIOMETRIC IDENTITY VERIFICATION OF USERS

(71) Applicant: Jian Liu, Hayward, CA (US)

(72) Inventor: Jian Liu, Hayward, CA (US)

( * ) Notice: Subject to any disclaimer, the term of this patent is extended or adjusted under 35 U.S.C. 154(b) by 109 days.

(21) Appl. No.: 18/828,849

(22) Filed: Sep. 9, 2024

(65) Prior Publication Data

US 2026/0073030 A1 Mar. 12, 2026

(51) Int. Cl.
*G06F 21/32* (2013.01)

(52) U.S. Cl.
CPC .................................... *G06F 21/32* (2013.01)

(58) Field of Classification Search
None
See application file for complete search history.

(56) References Cited

U.S. PATENT DOCUMENTS 10,019,561 B1 * 7/2018 Shelton .................. G10L 17/00
11,721,120 B1 * 8/2023 Parthe .................... G06V 40/60
2018/0039990 A1 * 2/2018 Lindemann ........... G06V 40/19
2018/0309792 A1 * 10/2018 Obaidi .................... G06F 21/32
2024/0311457 A1 * 9/2024 Jordanov .............. G06N 20/00

* cited by examiner

*Primary Examiner* — Henry Tsang
*Assistant Examiner* — Caroline Hoang-Anh Nguyen

(57) ABSTRACT

Disclosed herein is a method for facilitating self-optimizable biometrics identity verification of users, in accordance with some embodiments. Accordingly, the method includes obtaining one or more verifying data. The method includes retrieving one or more first verifying data of the user based on the verification requirement. The method includes matching the one or more verifying data with the one or more first verifying data of the user. The method includes determining an accuracy of a match between the one or more verifying data and the one or more first verifying data. The method includes generating a result for the self-optimizable biometrics identity verification based on the accuracy of the match. The method includes transmitting the result to a device. The method includes a step of authorizing the user for an interaction based on the result.

12 Claims, 14 Drawing Sheets

1100

| Biometric Method | Precision (False Acceptance Rate, FAR) | Precision (False Rejection Rate, FAR) |
|---|---|---|
| Fingerprint | Low | Low |
| Iris Recognition | Very high | Very high |
| Facial Recognition | Moderate | Moderate |
| Voice Recognition | Moderate to high | Moderate to high |
| Palmprint | Moderate | Moderate |
| Retina Scan | Very high | Very low |
| Hand Geometry | Moderate | Moderate |
| Signature Analysis | Moderate | Moderate |
| Gait Recognition | Moderate to high | Moderate to low |
| Word Use Analysis | Moderate to high | Moderate to low |
| Type Strength and/or Key Stroke Patterns | Moderate to high | Moderate to low |

FIG. 11

METHODS, SYSTEMS, APPARATUSES, AND DEVICES FOR FACILITATING SELF-OPTIMIZABLE BIOMETRIC IDENTITY VERIFICATION OF USERS

FIELD OF THE INVENTION

Generally, the present disclosure relates to the field of data processing. More specifically, the present disclosure describes a supervised learning AI model related to methods, systems, apparatuses, and devices for facilitating self-optimizable biometrics identity verification of users.

BACKGROUND OF THE INVENTION

The field of data processing is technologically important to several industries, business organizations, and/or individuals. In particular, the use of data processing is prevalent for facilitating self-optimizable biometrics identity verification of users.

Today's information, society revolution, and the rapid development of artificial intelligence, have ignited the torch of the fourth industrial revolution in the human world, awakened mankind's meditation on the future, and challenged the limits of existing technology. Human beings have realized many applications and products, such as remote communication, cross-cloud communication, over-the-range control, virtual world, intelligent clones, virtual meetings, remote control actual combat, online payment and payment, Meta world, simulated real people, etc.

Existing techniques for facilitating identity verification of users are deficient with regard to several aspects. For instance, current technologies do not authenticate users based on the false acceptance rate and false rejection rate for an authentication method. As a result, different technology is needed to authenticate users based on the false acceptance rate and false rejection rate for an authentication method. Furthermore, current technologies do not authenticate users based on combination methods. As a result, different technology is needed for authenticating users based on combination methods. Moreover, current technologies do not authenticate users based on weighted analysis of combination methods. As a result, different technology is needed to authenticate users based on weighted analysis of combination methods.

Therefore, there is a need for improved methods, systems, apparatuses, and devices for facilitating self-optimizable biometrics identity verification of users that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating self-optimizable biometrics identity verification of users, in accordance with some embodiments. Accordingly, the method may include a step of obtaining, using a processing device, one or more verifying data associated with at least one user for a verification requirement of a plurality of verification requirements. Further, the method may include a step of retrieving, using a storage device, one or more first verifying data of the at least one user based on the verification requirement. Further, the method may include a step of matching, using the processing device, the one or more verifying data with the one or more first verifying data of the at least one user. Further, the method may include a step of determining, using the processing device, an accuracy of a match between the one or more verifying data and the one or more first verifying data. Further, the method may include a step of generating, using the processing device, a result for the self-optimizable biometrics identity verification based on the accuracy of the match. Further, the method may include a step of transmitting, using a communication device, the result to at least one device. Further, the method may include a step of authorizing, using the processing device, the at least one user for at least one interaction based on the result.

Further, disclosed herein is a system for facilitating self-optimizable biometrics identity verification of users, in accordance with some embodiments. Accordingly, the system may include a communication device configured for transmitting a result to at least one device. Further, the system may include a processing device communicatively coupled with the communication device. Further, the processing device may be configured for obtaining one or more verifying data associated with at least one user for a verification requirement of a plurality of verification requirements. Further, the processing device may be configured for matching the one or more verifying data with one or more first verifying data of the at least one user. Further, the processing device may be configured for determining an accuracy of a match between the one or more verifying data and the one or more first verifying data. Further, the processing device may be configured for generating the result for the self-optimizable biometrics identity verification based on the accuracy of the match. Further, the processing device may be configured for authorizing the at least one user for at least one interaction based on the result. Further, the system may include a storage device communicatively coupled with the processing device. Further, the storage device may be configured for retrieving the one or more first verifying data of the at least one user based on the verification requirement.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 11 is a biometric method table 1100 for facilitating self-optimizable biometrics identity verification of users, in accordance with some embodiments.

DETAILED DESCRIPTION OF THE INVENTION

Figure 1:
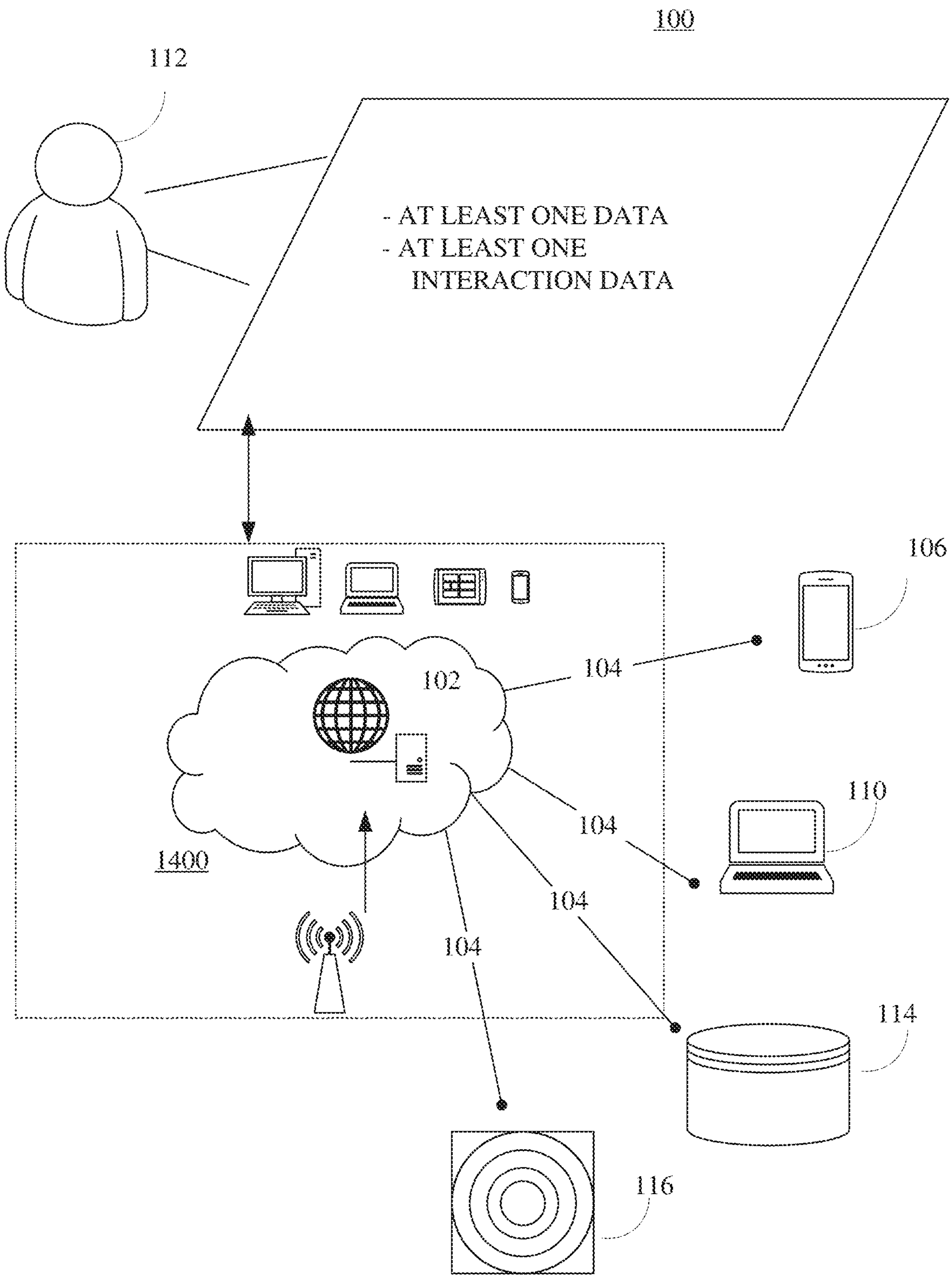
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating self-optimizable biometrics identity verification of users, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, self-optimizable biometrics identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating self-optimizable biometrics identity verification of users Further, the present disclosure describes systems and methods to optimize digital self-optimizable biometrics identity with digital certificates and the optimized verification algorithm that remotely collects and quantitatively assigns multiple human's featured biometric characteristics and optimizes the combination and configuration analysis to generate it.

Further, the present disclosure describes applying remote collection and analysis of human biometric characteristics to realize the entry, generation, verification, comparison, identification, optimization, confirmation, and use of digital personal ID cards.

Further, the present disclosure describes remote real-person identification, an audit by other parties, notarization of both parties, self-optimizable biometrics identity verification, original self-optimizable biometrics identity notarization, self-optimizable biometrics identity verification, etc. are urgent needs.

Further, the present disclosure describes the use of work, combined with the existing remote collection, generation, verification, comparison, identification, identification, confirmation, and use methods of universal human biological characteristics, to invent a comprehensive remote quantitative assignment of multiple human biological characteristics. Optimize the grouping analysis algorithm, combined with the establishment of an independent computing platform based on cloud computing, to further improve and ensure the practicality, convenience, feasibility, reliability, sustainability, accuracy, and precision of remote self-optimizable biometrics identity confirmation.

Further, the present disclosure describes a Comprehensive Elemental Weighting Analysis Algorithms: (Comprehensive multi-source elemental weighting analysis algorithm). Based on a biometric element table, the error levels are initially assigned for quantitative calculation of The Current Big Data Truth Table:

| No. | Biometric Methods <Elements> | False Acceptance Rate <FAR> | False Rejection Rate <FRR> |
|---|---|---|---|
| BM-1 | Fingerprint | Low | Low |
| BM-2 | Iris Recognition | Very high | Very low |
| BM-3 | Facial Recognition | Moderate | Moderate |
| BM-4 | Voice Recognition | Moderate to high | Moderate to low |
| BM-5 | Palmprint | Moderate | Moderate |
| BM-6 | Retina Scan | Very high | Very low |
| BM-7 | Hand Geometry | Moderate | Moderate |
| BM-8 | Signature Analysis | Moderate | Moderate |
| BM-9 | Gait Recognition | Moderate to high | Moderate to low |
| BM-10 | Word Use Analysis | Moderate to high | Moderate to low |
| BM-11 | Type Strength Patterns | Moderate to high | Moderate to low |

Further, the values are as follows:

Very high-end, assigned value: 5

High-end, assigned value: 4

Mid-range is on the high side, assigned value: 3.5

Mid-range, assigned value: 3

Mid-range is low, assigned value: 2.5

Low grade, assigned value: 2

Very low-end, assigned value: 1

Further, the present disclosure describes the Comprehensive Elemental Weighting Analysis Algorithms (Multi-source elemental weighting analysis algorithm). Further, the Comprehensive Elemental Weighting Analysis Algorithms may be configured to enter, verify, and prove the self-optimizable biometrics identity of the individual.

Further, the present disclosure describes combination principles. Further, the combinations may include an Iron combination method, using any seven or more elements (Total value>10), a Copper combination method, using any five or six elements (Total value<=10), a Silver combination method, using any three or four elements (Total value<=7.5), and a Gold combination method, using any one or two elements (Total value<=5).

Further, to express the combination methods mathematically, we define $E_i$ as the value of the i-th element, S as the set of selected elements, and |S| as the number of elements in set S.

Iron Combination Method

Use any seven or more elements.

The total value must be greater than 10.

Mathematically:

$$|S| \geq 7$$

$$\sum_{i \in S} E_i > 10$$

Copper Combination Method

Use any five or six elements.

The total value must be less than or equal to 10.

Mathematically:

$$5 \leq |S| \leq 6$$

$$\sum_{i \in S} E_i \leq 10$$

Silver Combination Method

Use any three or four elements.

The total value must be less than or equal to 7.5.

Mathematically:

$$3 \leq |S| \leq 4$$

$$\sum_{i \in S} E_i \leq 7.5$$

Gold Combination Method

Use any one or two elements.

The total value must be less than or equal to 5.

Mathematically:

$$1 \leq |S| \leq 2$$

$$\sum_{i \in S} E_i \leq 5$$

These formulas succinctly define the conditions for each combination method based on the number of elements and their total values.

Further, the gold combination method is set as the default method, and other methods can be selected or converted in real-time. FAR and FRR are calculated separately, and the settlement value is averaged with equal weights: (FAR+FRR)/2.

Further, the present disclosure describes determination principles and algorithms where all elements are comprehensively compared with the data, and the real person is determined to be consistent. After verification, authorization is granted. If the comparison data of any element does not match, it will be judged that the authentication has failed, and the user will be prompted to retry twice or deny authorization.

Further, the present disclosure describes optimization verification review principles and algorithms. This requires obtaining results from a larger global database, combining all other biometric processes, time periods, environments, and conditions, and optimizing to obtain the best results. Each time the personalized weight verification is successful, the personalized weight will be adjusted according to the group size. Further, the optimization verification and review are configured to optimize initial or existing assignments, minimize the influence of differences in peripheral environments, maximize the correction of specific personality differences, and make the final and most accurate decision.

Further, the present disclosure describes the technical solution, detailed steps of the method, the component composition of the device, and the connection relationship between the components and the working process.

Further, the present disclosure describes two stages: an online registration and entry stage and a real-time verification and review stage. Further, the stages comprise:

Register to join: The online registration stage is used to collect and enter the user's personal biometric information online.

Image Acquisition: Acquire high-resolution images

Segmentation module: detect boundaries and reduce noise

Feature extraction: pattern recognition

Compression encoding: Compress features for simple comparison

Module matching: Comparison of acquired and encoded features, including all patterns acquired during registration and enrollment phases.

Algorithmic decision-making: Determine whether there are matching features and patterns, and then establish a decision <Iris Scan Accuracy=1/10e27>.

Verification review: This stage requires obtaining results from a larger global database, combining all other biometric processes, time periods, environments, conditions, and conditions, and optimizing to obtain the best results. Each time the personalized weight verification is successful, the personalized weight will be adjusted according to the group size. Optimize initial or existing assignments. Minimize the influence of differences in peripheral environments, maximize the correction of specific personality differences, and make the final and most accurate decision. (Attachment 3)

Identification: eliminate suspicious or similar values, confirm successful self-optimizable biometrics identity verification, and authorize accordingly.

Further, the present disclosure describes the comprehensive application of multiple technologies:

Technology that provides users with personal information online. For example: a web application form to collect basic personal registration information.

Image scanning equipment technology. For example fingerprint entry key, iris infrared scanning camera.

Image transmission and storage technology with data privacy protection. For example: Information encryption technology Advanced Encryption Standard (AES 256-bit).

Image digital conversion and contrast processing algorithm technology. For example: Image comparison technology under deep learning.

Feature extraction technology for recognition patterns. For example: corner detection technology for local binary patterns and feature points.

Technology to digitally create templates through module coding. For example: Oriented gradient histogram technology.

Comprehensive elemental analysis algorithm technology that combines all other biometric results into one decision to achieve optimal accuracy by comparing deep learning of matching algorithm technology that calculates similarity. For example: convolutional neural network, Visual Geometry Group (VGG), etc.

Biometric database technology in the registration/entry stage and verification review stage. For example: the extended verification method.

Encryption technology that protects data in transit, at rest, and in use is integrated with access control systems. For example: Information encryption technology 256-bit (AES 256-bit).

Further, the present disclosure describes beneficial effects achieved through the above technical solutions Combined with specific improvements, point out the advantages of the present invention such as, remote implementation, comprehensive and diversified, utilizing strengths and avoiding weaknesses, convenient and practical, efficient and time-saving, ensuring accuracy.

Further, the present disclosure describes an application process. Further, the application process includes a preliminary online registration and entry stage (after entry, the confirmation identification code of the digital ID card will be issued) and an immediate online implementation stage. In the entry stage, multiple human biological information is collected, encrypted, and stored in the database, identified, compared, verified, expanded, and the confirmation identification code of the digital ID card is issued. Real-time flow chart of the implementation phase. For example, in a remote board meeting of a multinational group, the directors voluntarily registered and entered their personal biometric information in advance. The company held an online meeting, which required gold medal self-optimizable biometrics identity verification. A director clicked on the invitation to attend the meeting and provided a digital ID to confirm the identification code online, stimulating the corresponding multiple biometric characteristics and Online collection and verification process. Then, the comparison and identification process begins. After the inspection is completed, the verification result (confirm, deny, or retry) is reported. If confirmed, access to the meeting is authorized.

Further, the present disclosure describes the combination principle process. Further, the process can use mathematical model description to express conditions such as:

For the copper combination method:

Number of elements $n$: $3 \leq n \leq 10$

For the silver combination method:

Number of elements $m$: $2 \leq m \leq 10$.

Total value $\sum_{i=1}^{m} v_i$: $ \leq 7.5$

For the gold combination method:

Number of elements $p$: $1 \leq p \leq 10$

Total value $\sum_{i=1}^{p} v_i$: $ \leq 5$

Further, these equations describe the number of elements allowed for each combination method and the corresponding total value limit.

Further, the present disclosure describes mathematical formulas in the format of mathematical model language corresponding to the combination principle. Further, the mathematical model language may define variables such as:

n represents the number of elements.

T represents the total value of the elements.

Further, the present disclosure describes combination method selection rules. Further, the combination method selection rules comprise:

Copper combination method: number of elements n>3n≥3.

Silver combination method: the number of elements n≥2n≥2 and the total value T≤7.5 T≤7.5

Gold combination method: number of elements n<2n<2 or total value T>7.5 T>7.5

Further, the present disclosure describes the use of mathematical expressions based on the rules. Further, the use comprises:

Copper combination method (Bronze) Method=Bronzeifn≥3 Method=Bronzeifn≥3.

2. Silver combination method (Silver) Method-Silverifn≥2 and T≤7.5andn<3 Method=Silverifn≥2 and T≤7.5 and n<3.

3. Gold combination method (Gold) Method-Goldifn<2orT>7.5 Method=Goldifn<2orT>7.5

Further, the present disclosure describes a comprehensive expression. Further, the comprehensive expression may include combined conditions to write the mathematical expression for selecting the combination method as a whole. Further, the expression may include:

Method={Bronzeifn>3Silver if2≤n<3 and T≤7.5Goldifn<2orT>7.

Method=BronzeSilverGoldifn≥3if2≤n<3 and T≤7.5ifn<2orT>7.5

Further, when the number of elements n≥3n≥3, choose the copper combination method.

Further, when the number of elements n≥2n≥2 and the total value T≤7.5 T≤7.5, but the number of elements is less than 3, select the silver combination method.

Further, when the number of elements is less than 2 or the total value exceeds 7.5, select the gold combination method.

Further, the present disclosure describes a source code for implementing the above comprehensive expression mathematical model in Java computer language. Further, the source code may be

```
import java.util.ArrayList;
public class CombinationMethod {
 public static boolean isCopperCombination(int[ ] elements) {
     // Copper combination method: Number of elements n: 3 ≤ n ≤ 10
     return elements.length >= 3 && elements.length <= 10;
 }
  public static boolean isSilverCombination(int[ ] elements, double[ ] values) {
     // Silver combination method: number of elements m: 2 ≤ m ≤ 10, total value ≤ 7.5
     if (elements.length >= 2 && elements.length <= 10) {
        double sum = 0;
        for (int i = 0; i < elements.length; i++) {
           sum += values[elements[i]];
        }
        return sum <= 7.5;
     }
     return false;
 }
```

Further, the present disclosure describes a logical statement of steps of a comprehensive algorithm in the form of a mathematical model. Suppose a set $S$ that contains several elements, each element has a value. Further, the comprehensive algorithm uses $n$ to represent the number of elements, and $v_i$ to represent the value of the $i$th element. Further, for the copper combination method, the mathematical model can be expressed as:

Number of elements: $n \geq 3$ and $\sum_{i=1}^{n} v_i \leq 10$.

Calculate FAR (False Acceptance Rate) and FRR (False Rejection Rate).

Calculate the fruit value: $ fruit value=\frac {FAR+FRR} {2} $.

Further, for the silver combination method, the mathematical model can be expressed as:

Number of elements: $n \geq 2$ and $\sum_{i=1}^{n} v_i \leq 7.5$.

Calculate FAR and FRR.

Calculate the fruit value: $ fruit value=\frac {FAR+FRR} {2} $.

Further, for the gold combination method (default), the mathematical model can be expressed as:

Number of elements: $n \geq 1$ and $\sum_{i=1}^{n} v_i ∴leq 5$.

Calculate FAR and FRR.

Calculate the fruit value: $ fruit value=\frac {FAR+FRR} {2} $.

Further, these formulas describe how FAR, FRR, and fruit values are calculated based on the number and total value of elements for each combination method.

Further, the present disclosure describes the mathematical logic formula of the mathematical model used to state the above mathematical model. Further, assuming that the selected combination method MM can be a copper combination method (Bronze), a silver combination method (Silver), or a gold combination method (Gold). Based on the different combination methods, the corresponding number of elements and total value conditions are defined as follows:

Copper combination method (Bronze), the number of elements nB≥3nB≥3, and the total value TB≤10 TB≤10

Silver combination method (Silver), the number of elements nS≥2nS≥2, and the total value TS≤7.5TS≤7.5

Gold combination method (Gold), the number of elements is nG≥1nG≥1, and the total value is TG≤5TG≤5

Further, the present disclosure describes that for each combination method M, its FAR and FRR are assumed to be FARM and FRRM respectively.

Further, the present disclosure describes calculation for Average Error Rate (AER):

AER=FARM+FRRM

2AER=2FARM+FRRM

T≤7.5 if n≥1 and T≤5

Further, the present disclosure describes a mathematical model that calculates the false acceptance rate, false rejection rate, and result value based on different combination methods and their corresponding conditions.

Further, the present disclosure describes the source code for implementing the above mathematical model in Java computer language. Further, the source code is:

```
import java.util.ArrayList;
public class CombinationMethod {
  public static final int COPPER = 1;
  public static final int SILVER = 2;
  public static final int GOLD = 3;
  public static int chooseCombinationMethod(int[ ] elements, double[ ] values) {
    //Select a combination method based on the number of elements and total value
    int numElements = elements.length;
    double totalValue = calculateTotalValue(elements, values);
    if (numElements >= 3 && numElements <= 10 && totalValue <= 10) {
      return COPPER;
    } else if (numElements >= 2 && totalValue <= 7.5) {
      return SILVER;
    } else if (numElements >= 1 && totalValue <= 5) {
      return GOLD;
    } else {
      //Default gold combination method
      return GOLD;
    }
  }
  public static double calculateTotalValue(int[ ] elements, double[ ] values) {
    // Calculate total value
    double totalValue = 0;
    for (int element : elements) {
      totalValue += values[element];
    }
    return totalValue;
  }
  public static void main(String[ ] args) {
    // Example: Select combination method and algorithm process
    int[ ] elements = {1, 2, 3}; // Example elements
    double[ ] values = {1.5, 2.3, 3.1, 4.0}; // Example values
    int chosenMethod = chooseCombinationMethod(elements, values);
    switch (chosenMethod) {
      case COPPER:
        System.out.println("Select copper combination method");
        break;
      case SILVER:
        System.out.println("Select silver combination method");
        break;
```

-continued

```
        case GOLD:
          System.out.println("Select gold combination method");
          break;
        default:
          System.out.println("Select the default gold combination method");
          break;
      }
    }
}
```

Further, the present disclosure describes the need to define some variables and establish formulas to describe the process of obtaining results from a global database, combining various biometric data, personalizing weight adjustments, and finally making a decision in the validation review phase. Further, the defined variables may include:

R: Result set in a global database
B: Biometric Dataset
T: period data
E: Environmental data
C: Condition and condition data
P: Personalized weight
Wi: Weight adjustment of individual ∞i
S: group size
D: final decision.
A: The accuracy of the final decision Further, the present disclosure describes steps and formulas comprised in the method.

Further, the method includes getting the global result set: $R=f_{global}(B,T,E,C)$. Here $f_{global}$ is a function that gets the results from the global database, combined with the biometric data B, period data T, environmental data E, and condition and status data C.

Further, the method may include a process of combining all biometrics: $R_{combined}$=g (R,B,T,E,C) where g is a function that combines all relevant data to integrate the result set R.

Further, the method may include personalized weight verification and adjustment. Each time the personalized weight verification is successful, the personalized weight P is adjusted according to the group size S, new=P+ΔW. SPi, new=Pi+SΔWi where P, Pi is the weight of individual vii, and ΔW. Further, the ΔWi is the weight adjustment value for individual δi.

Further, the method may include minimizing the influence of differences in the external environment and maximizing the correction of specific personality differences:

$$P_{adjusted} = \arg\min\left(\sum\nolimits_{j=1}^{n}|E_j - \bar{E}|\right) + \arg\max\left(\sum\nolimits_{k=1}^{m}|P_k - \bar{P}|\right).$$

Here $\bar{E}$ is the average value of environmental data, and $\bar{P}$ is the average value of personalized weights.

Further, the method may include making the final and highest accuracy decision: $D=h(R_{combined}, P_{adjusted})$ where h is a decision function that makes the final decision based on the comprehensive results and adjusted personalized weights.

Further, the method may include calculating the accuracy of the final decision:

$$A = \frac{\sum\nolimits_{i=1}^{N} I(D_i = \text{True})}{N}$$

where I is the indicator function, when Di is true, I=1, otherwise I=0 and N is the total number of verifications.

Further, the final mathematical model can be summarized as follows:

$$P_{adjusted} = \arg\min\left(\sum_{j=1}^{n}|E_j - \bar{E}|\right) + \arg\max\left(\sum_{k=1}^{m}|P_k - \bar{P}|\right)$$

$$D = h(R_{Combined}, P_{adjusted})$$

$$A = \frac{\sum\nolimits_{i=1}^{N} I(D_i = \text{True})}{N}$$

Further, the model comprehensively considers obtaining results from the global database, combining all biometric data, adjusting personalized weights, and ultimately minimizing environmental differences and maximizing personalized corrections to achieve the highest decision-making accuracy. The validation review phase obtains results from a larger global database and combines all other biometric processes, time periods, environments, and conditions to obtain the best results. Each time the personalized weight verification is successfully optimized the personalized weight will be adjusted according to the group size. Minimize the impact of differences in peripheral environments, maximize the correction of specific personality differences, and make final and highest-accuracy decisions.

Further, the present disclosure describes various components to create a mathematical formula representing the described method. Further, the components comprise results from a global database, a combination of biometric processes, time periods, environments, conditions, personalized weight verification, adjustment according to group size, minimization of peripheral environmental differences, maximization of personality correction, and final decision accuracy. Further, the variables and parameters for the components may be described as:

R: Results from the global database.
Bi: Biometric process i for i=1, 2, . . . , n.
T: Time period j for j=1, 2, . . . , m.
E: Environment k for k=1, 2, . . . , p.
$C_l$: Condition l for l=1, 2, . . . , q.
W: Personalized weight.
G: Group size.
α: Weight adjustment factor.
β: Correction factor for personality differences.
γ: Minimization factor for peripheral environmental differences.

Further, the process can be encapsulated in the following formula:

$$D = \arg\max\Big[Z1 \sum\nolimits_{i=1}^{n}\sum\nolimits_{j=1}^{m}\sum\nolimits_{k=1}^{p}\sum\nolimits_{l=1}^{q}(R \cdot B_i \cdot T_j \cdot E_k \cdot C_l \cdot W \cdot \gamma) \cdot \beta \cdot$$

-continued $$\alpha(G)\Big]$$

D represents the final decision.

Z is a normalization factor to ensure the combined results are properly scaled.

Further, the present disclosure describes:

Combination of Results:

$$\sum_{i=1}^{n}\sum_{j=1}^{m}\sum_{k=1}^{p}\sum_{l=1}^{q}(R\cdot B_i\cdot T_j\cdot E_k\cdot C_l)$$

This nested summation captures the combination of results from the global database across all biometric processes, time periods, environments, and conditions.

Personalized Weight W:

The combined results are multiplied by the personalized weight W.

Minimization of Environmental Differences γ:

γ is applied to minimize the impact of differences in peripheral environments.

Maximization of Personality Correction β:

β is applied to maximize the correction of specific personality differences.

Weight Adjustment α(G):

(G) represents the adjustment of the personalized weight according to the group size G.

Maximizing Decision Accuracy:

The argmaxD notation indicates the decision D that maximizes the combined and adjusted results.

Further, using this formula, the present disclosure encapsulates the multi-dimensional integration and adjustment process to arrive at the final and most accurate decision.

Further, it may be demonstrated that as of below:

To create a mathematical formula that encapsulates the described process, results from various components need to be integrated and specific adjustments are applied. By breaking it down step-by-step and defining the variables clearly, the following are obtained:

Variables and Parameters:

R: Results from the global database.

$B_i$: Biometric process i for i=1, 2, . . . , n.

$T_j$: Time period j for j=1, 2, . . . , m.

$E_k$: Environment k for k=1, 2, . . . , p.

$C_l$: Condition l for l=1, 2, . . . , q.

W: Personalized weight.

G: Group size.

α(G): Weight adjustment factor based on group size.

β: Correction factor for personality differences.

γ: Minimization factor for peripheral environmental differences.

Further, the present disclosure describes a construction of formulas. Further, the formulas may include:

Combination of Results: start by combining the results from the global database across all biometric processes, time periods, environments, and conditions. Further, $$S=\sum_{i=1}^{n}\sum_{j=1}^{m}\sum_{k=1}^{p}\sum_{l=1}^{q}(R\cdot B_i\cdot T_j\cdot E_k\cdot C_l).$$

Incorporation of Personalized Weight and Minimization of Environmental Differences: The combined results S is then multiplied by the personalized weight W and the minimization factor γ. Further, S'=S·W·γ.

Correction for Personality Differences: Next, the correction factor β for personality differences is applied. Further, S"=S·B.

Adjustment Based on Group Size: Finally, the result is adjusted based on the group size GG using the weight adjustment factor (G). Further, S'"=S"·α(G).

Normalization and Decision Making: To ensure the results are properly scaled, the disclosure introduces a normalization factor Z. The final decision D is the one that maximizes the normalized, adjusted result. Further, D-arg max (ZS'").

Final Formula:

Combining all these steps, the final formula is:

$$D=\arg\max\Big[Z1\sum_{i=1}^{n}\sum_{j=1}^{m}\sum_{k=1}^{p}\sum_{l=1}^{q}(R\cdot B_i\cdot T_j\cdot E_k\cdot C_l\cdot W\cdot\gamma)\cdot\beta\cdot\alpha(G)\Big]$$

Further, explanation is described:

1. Combination of the result:

$$\sum_{i=1}^{n}\sum_{j=1}^{m}\sum_{k=1}^{p}\sum_{l=1}^{q}(R\cdot B_i\cdot T_j\cdot E_k\cdot C_l).$$

This part aggregates the results from the global database across various dimensions.

2. Application of Personalized Weight and Environmental Minimization: Multiplying by W·γ adjusts the combined results to incorporate personalized weights and minimize environmental impacts.

3. Personality Correction: Multiplying by β corrects for specific personality differences.

4. Group Size Adjustment: Multiplying by α(G) adjusts the results according to group size.

5. Normalization and Decision: The normalization factor Z scales the results appropriately, and the arg max D operator finds the decision D that maximizes the final adjusted result.

By following this structured approach, the formula integrates all the specified components to optimize and make the final decision with the highest accuracy.

Further, the present disclosure describes formulas $$R=f_{global}(B,T,E,C)$$

$$R_{combined}=g(R,B,T,E,C)$$

$$P_{i,new}=P_i+\frac{\Delta W_i}{S}$$

$$P_{adjusted}=\arg\min\Big(\sum_{j=1}^{n}|E_j-\bar{E}|\Big)+\arg\max\Big(\sum_{k=1}^{m}|P_k-\bar{P}|\Big)$$

$$D=h(R_{Combined},P_{adjusted})$$

$$A=\frac{\sum_{i=1}^{N}I(D_i=\text{True})}{N}$$

Further, the present disclosure describes a java code. Further, the code may include:

```
import java.util.*;
public class BiometricVerification {
        // declare veriables
    static class Data {
        List<Double> biometricData;
        double timeData;
        double environmentData;
        double conditionData;
        public Data(List<Double> biometricData, double timeData, double environmentData,
double conditionData) {
            this.biometricData = biometricData;
            this.timeData = timeData;
            this.environmentData = environmentData;
            this.conditionData = conditionData;
        }
    }
    static class Result {
        List<Double> results;
        public Result(List<Double> results) {
            this.results = results;
        }
    }
    static class Decision {
        boolean isTrue;
        public Decision(boolean isTrue) {
            this.isTrue = isTrue;
        }
    }
    public static Result fGlobal(Data data) {
        return new Result(new ArrayList< >(data.biometricData));
    }
    public static Result combineResults(Result r, Data data) {
        // Simulate a function that combines all biometric data
        r.results.addAll(data.biometricData);
        return r;
    }
    public static double calculateAverage(List<Double> list) {
        double sum = 0;
        for (double value : list) {
            sum += value;
        }
        return sum / list.size( );
    }
    public static List<Double> adjustWeights(List<Double> weights, List<Double>
adjustments, int size) {
        for (int i = 0; i < weights.size( ); i++) {
            weights.set(i, weights.get(i) + adjustments.get(i) / size);
        }
        return weights;
    }
    public static List<Double> minimizeEnvironmentDifference(List<Double>
environmentData, double average) {
        List<Double> result = new ArrayList< >( );
        for (double value : environmentData) {
            result.add(Math.abs(value - average));
        }
        return result;
    }
    public static List<Double> maximizePersonalDifference(List<Double> personalWeights,
double average) {
        List<Double> result = new ArrayList< >( );
        for (double value : personalWeights) {
            result.add(Math.abs(value - average));
        }
        return result;
    }
    public static Decision makeFinalDecision(Result combinedResult, List<Double>
adjustedWeights) {
        //function for final decision
        double sum = 0;
        for (double value : combinedResult.results) {
            sum += value;
        }
        double threshold = sum / combinedResult.results.size( );
        return new Decision(threshold > 0.5); // It is assumed here that the threshold is
  0.5
    }
```

-continued

```
  public static double calculateAccuracy(List<Decision> decisions) {
    int count = 0;
    for (Decision decision : decisions) {
      if (decision.isTrue) {
        count++;
      }
    }
    return (double) count / decisions.size( );
  }
  public static void main(String[ ] args) {
    // sample data
    List<Double> biometricData = Arrays.asList(0.1, 0.3, 0.4, 0.5);
    double timeData = 0.2;
    double environmentData = 0.3;
    double conditionData = 0.4;
    Data data = new Data(biometricData, timeData, environmentData, conditionData);
    // Global Result
    Result globalResult = fGlobal(data);
    // comprehensive result
    Result combinedResult = combineResults(globalResult, data);
    // Personalization and Optimization
    List<Double> personalWeights = Arrays.asList(0.2, 0.3, 0.4);
    List<Double> weightAdjustments = Arrays.asList(0.1, 0.1, 0.1);
    int groupSize = 10;
    List<Double> newWeights = adjustWeights(personalWeights, weightAdjustments,
groupSize);
    // Minimize environment factor and Maxminze the individual factor
    double environmentAverage = calculateAverage(Arrays.asList(environmentData));
    double personalWeightAverage = calculateAverage(newWeights);
    List<Double> adjustedEnvironment =
minimizeEnvironmentDifference(Arrays.asList(environmentData), environmentAverage);
    List<Double> adjustedPersonalWeights = maximizePersonalDifference(newWeights,
personalWeightAverage);
    // final decision
    Decision finalDecision = makeFinalDecision(combinedResult, newWeights);
   // final decision and accurcy
    List<Decision> decisions = Arrays.asList(finalDecision);
      // one decision only
    double accuracy = calculateAccuracy(decisions);
    // Decision and accuracy
    System.out.println("Final Decision: " + finalDecision.isTrue);
    System.out.println("Accuracy: " + accuracy);
 }
```

Further, the present disclosure describes examples of image recognition and identification algorithms:

Edge detection: Identify the edges of objects by detecting changes in pixel values in the image. Commonly used algorithms include Sobel. Prewitt, and Canny.

Corner point detection: Identify the corner points in the image. These corner points usually represent important feature points in the image. Commonly used algorithms include Harris corner point detection and FAST corner point detection.

Texture features: describe the texture information in the image. Commonly used methods include Local Binary Patterns (LBP) and Gray Level Co-occurrence Matrix (GLCM).

Color histogram: describes the frequency of occurrence of different colors in the image, which can be a global color histogram or a local color histogram.

Scale-Invariant Feature Transform (SIFT): Extract key points in the image and describe these key points, which has scale invariance and rotation invariance.

Histogram of Oriented Gradients (HOG): describes the gradient information of local areas in the image and is often used for tasks such as target detection and human posture recognition.

Deep learning features: Use deep learning models (such as convolutional neural networks) to learn feature representations from images. Pre-trained models (such as VGG, ResNet, Inception, etc.) are usually used for feature extraction.

Further, the present disclosure provides a solution to technical problems associated with self-optimizable biometrics identity verification of users. Further, the technological problems may include an introduction of errors in the verification of the self-optimizable biometrics identity of the users due to environmental variability which captures the biometrics of the user. Further, the identify verification is done by capturing the biometrics of the users. Further, the self-optimizable biometrics identity verification done using the biometrics of the users requires capturing the biometrics of the users. Further, the biometrics that are captured are affected by environmental conditions (such as lighting, noise, temperature, device variability, etc.). Therefore, the biometrics captured for the verifying of the self-optimizable biometrics identity of the user faces accuracy issues. Further, the present disclosure describes systems and methods for facilitating self-optimizable biometrics identity verification of users that may provide a technological solution to the problem of errors in the verification of the self-optimizable biometrics identity of the user due to environmental variability.

FIG. 1 is an illustration of an online platform 100 consistent with various embodiments of the present disclosure. By way of non-limiting example, the online platform 100 to facilitate self-optimizable biometrics identity verification of users may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1400.

Figure 2:
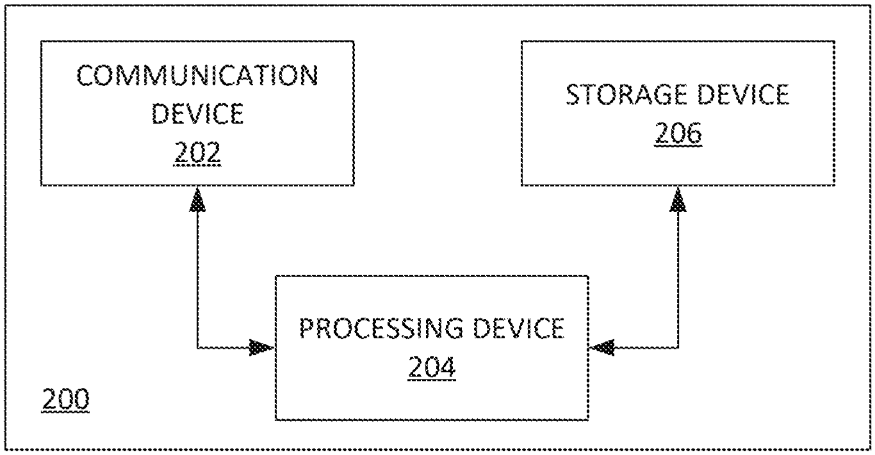
FIG. 2 is a block diagram of a system 200 for facilitating self-optimizable biometrics identity verification of users, in accordance with some embodiments.

FIG. 2 is a block diagram of a system 200 for facilitating self-optimizable biometrics identity verification of users, in accordance with some embodiments. Accordingly, the system 200 may include a communication device 202, a processing device 204, and a storage device 206.

Figure 3:
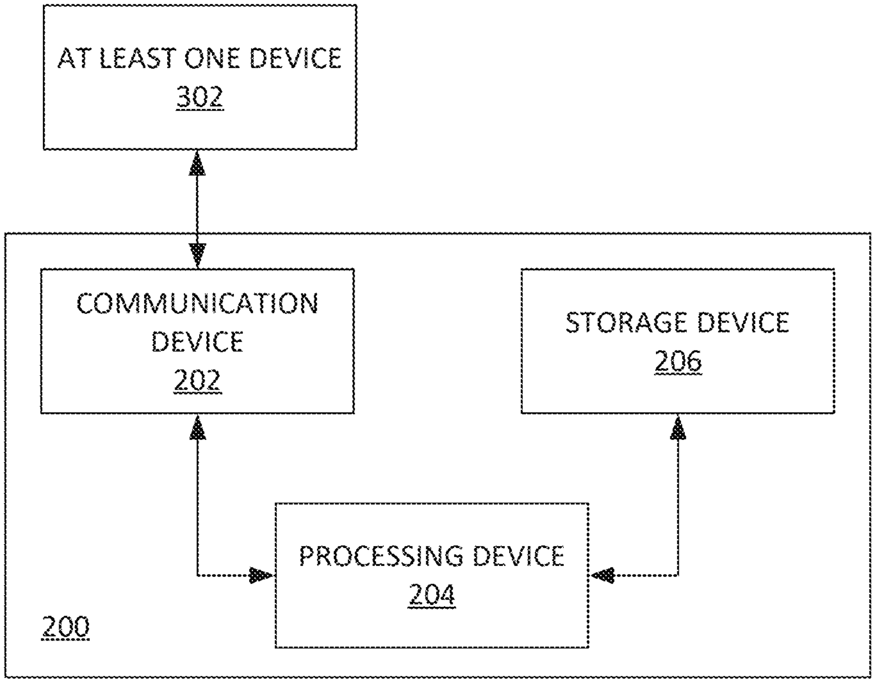
FIG. 3 is a block diagram of the system 200 for facilitating the self-optimizable biometrics identity verification of users, in accordance with some embodiments.

Further, the communication device 202 may be configured for transmitting a result to at least one device 302, as shown in FIG. 3. Further, the result may include a valid authentication result and an invalid authentication result. Further, the valid authentication result may include a confirmation of a self-optimizable biometrics identity. Further, the invalid authentication result may include a mismatch of the self-optimizable biometrics identity. Further, the at least one device 302 may include a smartphone, a tablet, a computer, a mobile, a client device, a user device, etc.

Further, the processing device 204 may be communicatively coupled with the communication device 202. Further, the processing device 204 may be configured for obtaining one or more verifying data associated with at least one user for a verification requirement of a plurality of verification requirements. Further, the obtaining of the one or more verifying data may be based on at least one machine learning model. Further, the at least one machine learning model may be a supervised learning artificial intelligence (AI) model. Further, the at least one machine learning model may include one or more self-optimizable methods based on one or more values associated with the verification requirement. Further, the one or more values may be revisable based on the verification requirement. Further, the plurality of verification requirements may include a gold medal self-optimizable biometrics identity verification, a silver medal self-optimizable biometrics identity verification, a bronze medal self-optimizable biometrics identity verification, an iron medal self-optimizable biometrics identity verification, etc. Further, each of the plurality of verification requirements may be characterized by a number of biometric verification methods, a type of the biometric verification methods, a combined value of the number of the biometric verification methods, etc. Further, the one or more verifying data may include biometrics of the at least one user. Further, the one or more verifying data associated with the at least one user may include a fingerprint data of the at least one user, a facial data of the at least one user, an iris data of the at least one user, etc. Further, the plurality of verification requirements may include a facial recognition, a fingerprint recognition, an iris recognition, etc. Further, the processing device 204 may be configured for matching the one or more verifying data with one or more first verifying data of the at least one user. Further, the one or more first verifying data may include a first fingerprint data collected at a time of registration, a first facial data collected at a time of registration, a first iris data collected at a time of registration, etc. Further, the processing device 204 may be configured for determining an accuracy of a match between the one or more verifying data and the one or more first verifying data. Further, the accuracy may be associated with a quality of authentication, a degree of match, etc. Further, the match may include determining a similarity in the one or more verifying data and the one or more first verifying data. Further, the processing device 204 may be configured for generating the result for the self-optimizable biometrics identity verification based on the accuracy of the match. Further, the processing device 204 may be configured for authorizing the at least one user for at least one interaction based on the result. Further, the authorizing may include granting a permission to, for example, but not limited to an online meeting, a webpage, a content, etc. Further, the at least one interaction may include accessing a content, a webpage, a website, etc, joining a communication session (meeting, conference, etc.), etc.

Further, the storage device 206 may be communicatively coupled with the processing device 204. Further, the storage device 206 may be configured for retrieving the one or more first verifying data of the at least one user based on the verification requirement.

Figure 4:
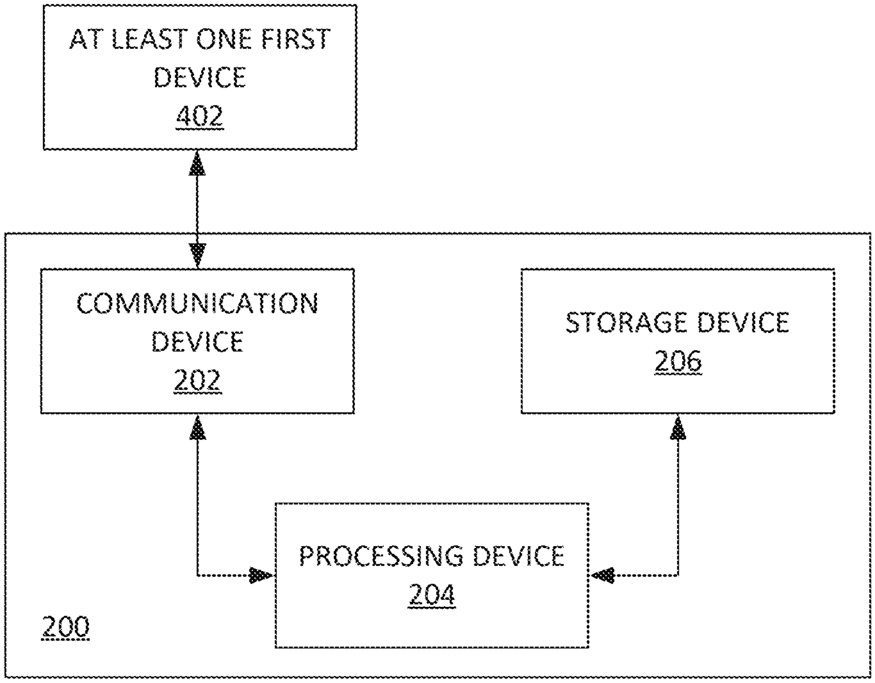
FIG. 4 is a block diagram of the system 200 for facilitating the self-optimizable biometrics identity verification of users, in accordance with some embodiments.

Further, in some embodiments, the communication device 202 may be further configured for receiving at least one interaction data associated with the at least one interaction from at least one first device 402, as shown in FIG. 4. Further, the at least one interaction data may include a type (such as a meeting, an audio conferencing, a video conferencing, etc.), a sensitivity, a rule, an importance, a privacy policy, a legal compliance, etc., of the at least one interaction. Further, the at least one interaction data may include login credentials, a name, an email, etc. Further, the at least one interaction may include visiting a webpage, joining an online meeting, etc. Further, the processing device 204 may be further configured for analyzing the at least one interaction data. Further, the processing device 204 may be further configured for determining the verification requirement from the plurality of verification requirements for the at least one interaction based on the analyzing of the at least one interaction data. Further, the obtaining of the one or more verifying data may be based on the determining of the verification requirement. Further, the at least one first device 402 may include a client device, a computing device, a server, etc.

Further, in an embodiment, each of the plurality of verification requirements corresponds to a number of verification methods from a plurality of verification methods for the self-optimizable biometrics identity verification of the at least one user and a total verification value. Further, the plurality of verification methods may include a plurality of biometric verification methods. Further, the number of verification methods may include a combination of verification methods. Further, the combination of verification methods may correspond to a copper combination method, a silver combination method, a gold combination method, etc. Further, the copper combination method may include at least three verification methods. Further, the silver combination method may include n number of verification methods. Further, the n corresponds to $n \geq 2n \geq 2$. Further, the gold combination method may include a second range for the number of verification methods. Further, the range may include $n<2n<2$. Further, the total verification value may include a mathematical value associated with a precision of the combination of verification methods. Further, the mathematical value associated with the copper combination may be greater than or equal to 10. Further, the mathematical value associated with the silver combination method may include a range. Further, the range may include T≤7.5 T≤7.5. Further, the mathematical value associated with the gold combination method may include a first range. Further, the first range may include T>7.5 T>7.5. Further, the one or more verifying data corresponds to the number of verification methods. Further, in an embodiment, the gold combination method corresponds to gold medal self-optimizable biometrics identity verification, the silver combination method corresponds to the silver medal self-optimizable biometrics identity verification, the bronze combination method corresponds to the bronze medal self-optimizable biometrics identity verification, and the iron combination method corresponds to the iron medal self-optimizable biometrics identity verification.

Further, in an embodiment, each of the plurality of verification methods may be characterized by at least one value parameter. Further, the at least one value parameter may include a precision value associated with a False Acceptance Rate (FAR), a False Rejection Rate (FRR), etc. Further, the at least one value parameter may be based on the FAR, the FRR, etc. Further, the precision value may include, for example, very low, low, moderate to low, moderate, moderate to high, high, and very high. Further, the at least one value parameter may be associated with at least one value. Further, the at least one value may include a first mathematical value associated with the precision value of each of the plurality of verification methods. Further, the total verification value for the number of verification methods may be based on the at least one value of the at least one value parameter of the number of verification methods. Further, the determining of the verification requirement may include selecting one or more verification methods from the plurality of verification methods based on the number of verification methods of the verification requirement. Further, the selecting of the one or more verification methods may be based on a correspondence of a summation of the at least one value of the at least one value parameter of the one or more verification methods to the total verification value for the verification requirement. Further, the one or more verifying data corresponds to the one or more verification methods.

Further, in some embodiments, the processing device 204 may be further configured for obtaining one or more results for the self-optimizable biometrics identity verification of one or more users. Further, the one or more results may include previous results associated with the verification of the self-optimizable biometrics identity of one or more previous users. Further, the one or more results may include results associated with the plurality of verification methods. Further, the processing device 204 may be further configured for obtaining one or more information associated with the one or more results based on the obtaining of the one or more results. Further, the one or more information may be associated with at least one of one or more verification methods associated with the one or more results, one or more time periods associated with the one or more results, one or more environmental conditions associated with the one or more results, one or more conditions associated with the one or more results, and one or more statuses associated with the one or more results. Further, the at least one of one or more verification methods may include at least one of facial verification, fingerprint verification, iris verification, etc. Further, the one or more time periods may include time periods associated with the time of registration and a time of authentication. Further, the one or more environmental conditions may include environmental noise, air quality, viewing distance, etc. Further, the one or more conditions may include network type, network noise, etc. Further, the one or more statuses may include at least one status of the result. Further, the at least one status of the result may include a generated result, a pending result, etc. Further, the processing device 204 may be further configured for analyzing the one or more results and the one or more information. Further, the processing device 204 may be further configured for optimizing at least one existing value of the at least one value parameter for at least one of the plurality of verification methods based on the analyzing of the one or more results and the one or more information. Further, the at least one existing value may include a second mathematical value associated with the precision of the plurality of verification methods. Further, the processing device 204 may be further configured for generating the at least one value for the at least one value parameter for the plurality of verification methods based on the optimizing.

Further, in an embodiment, the at least one existing value may be associated with at least one existing weight. Further, the at least one existing weight may include a third mathematical value associated with the at least one existing weight. Further, the optimizing may include verifying the at least one existing weight of the at least one value parameter based on the analyzing of the one or more results and the one or more information. Further, the optimizing further may include adjusting the at least one existing weight based on the verifying of the at least one existing weight. Further, the optimizing further may include generating at least one weight of the at least one value parameter. Further, the generating of the at least one value for the at least one value parameter may be further based on the at least one weight.

Further, in an embodiment, the communication device 202 may be further configured for transmitting one or more prompts to the at least one device 302, as shown in FIG. 3. Further, the one or more prompts may include a text, an audio, a web link, etc. Further, the at least one device 302 may be configured for presenting the one or more prompts to the at least one user. Further, the obtaining of the one or more verifying data may include obtaining the one or more verifying data from the at least one device 302 based on the presenting of the one or more prompts. Further, the processing device 204 may be further configured for generating one or more prompts for acquiring the one or more verifying data based on the determining of the verification requirement. Further, the one or more prompts corresponds to the number of verification methods.

Figure 5:
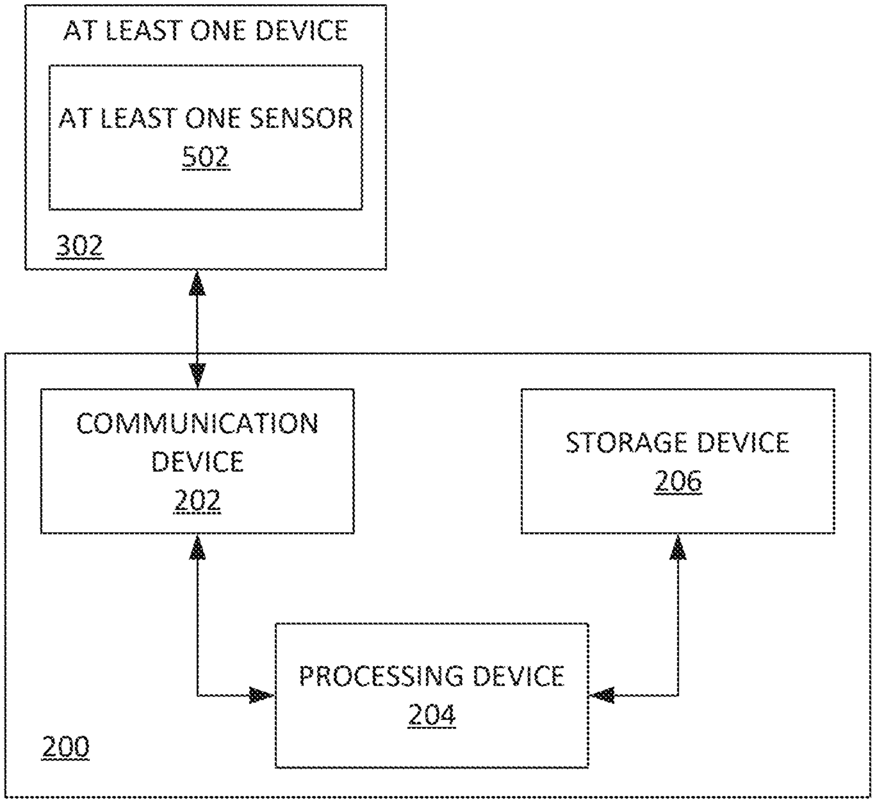
FIG. 5 is a block diagram of the system 200 for facilitating the self-optimizable biometrics identity verification of users, in accordance with some embodiments.

Further, in an embodiment, the at least one device 302 may include at least one sensor 502, as shown in FIG. 5. Further, the at least one sensor 502 may include an iris scanner, a gait scanner, a fingerprint scanner, a face scanner, etc. Further, the at least one sensor 502 may be configured for detecting one or more verification characteristics of the at least one user. Further, the one or more verification characteristics may include a pattern in a fingerprint, a contrast in a face, a color of a retina, a pattern in an iris, etc. Further, the obtaining of the one or more verifying data may include generating the one or more verifying data based on the detecting of the one or more verification characteristics.

Further, in some embodiments, the communication device 202 may be further configured for receiving at least one data associated with the at least one user from the at least one device 302. Further, the at least one data may include a name, an email, a digital self-optimizable biometrics identity card, etc. Further, the processing device 204 may be further configured for analyzing the at least one data based on the verification requirement. Further, the obtaining of the one or more verifying data associated with the at least one user for the verification requirement may be further based on the analyzing of the at least one data.

Further, in some embodiments, the matching of the one or more verifying data with the one or more first verifying data may include analyzing the one or more verifying data using at least one machine learning model. Further, the at least one machine learning model may be a supervised learning artificial intelligence (AI) model. Further, the at least one machine learning model may include a deep learning model. Further, the at least one machine learning model may include a convolutional neural network (CNN), a recurrent neural network (RNN), etc. Further, the at least one machine learning model may be trained for extracting at least one feature from the one or more verifying data. Further, the at least one feature may include a pattern, a contrast, a color, etc. Further, the matching of the one or more verifying data with the one or more first verifying data may include matching the at least one feature with at least one first feature of the one or more first verifying data using the at least one machine learning model. Further, the at least one first feature may include a first pattern, a first contrast, a first color, etc. Further, the determining of the accuracy of the match may be further based on the matching of the at least one feature with the at least one first feature.

FIG. 3 is a block diagram of the system 200 for facilitating the self-optimizable biometrics identity verification of users, in accordance with some embodiments.

FIG. 4 is a block diagram of the system 200 for facilitating the self-optimizable biometrics identity verification of users, in accordance with some embodiments.

FIG. 5 is a block diagram of the system 200 for facilitating the self-optimizable biometrics identity verification of users, in accordance with some embodiments.

Figure 6:
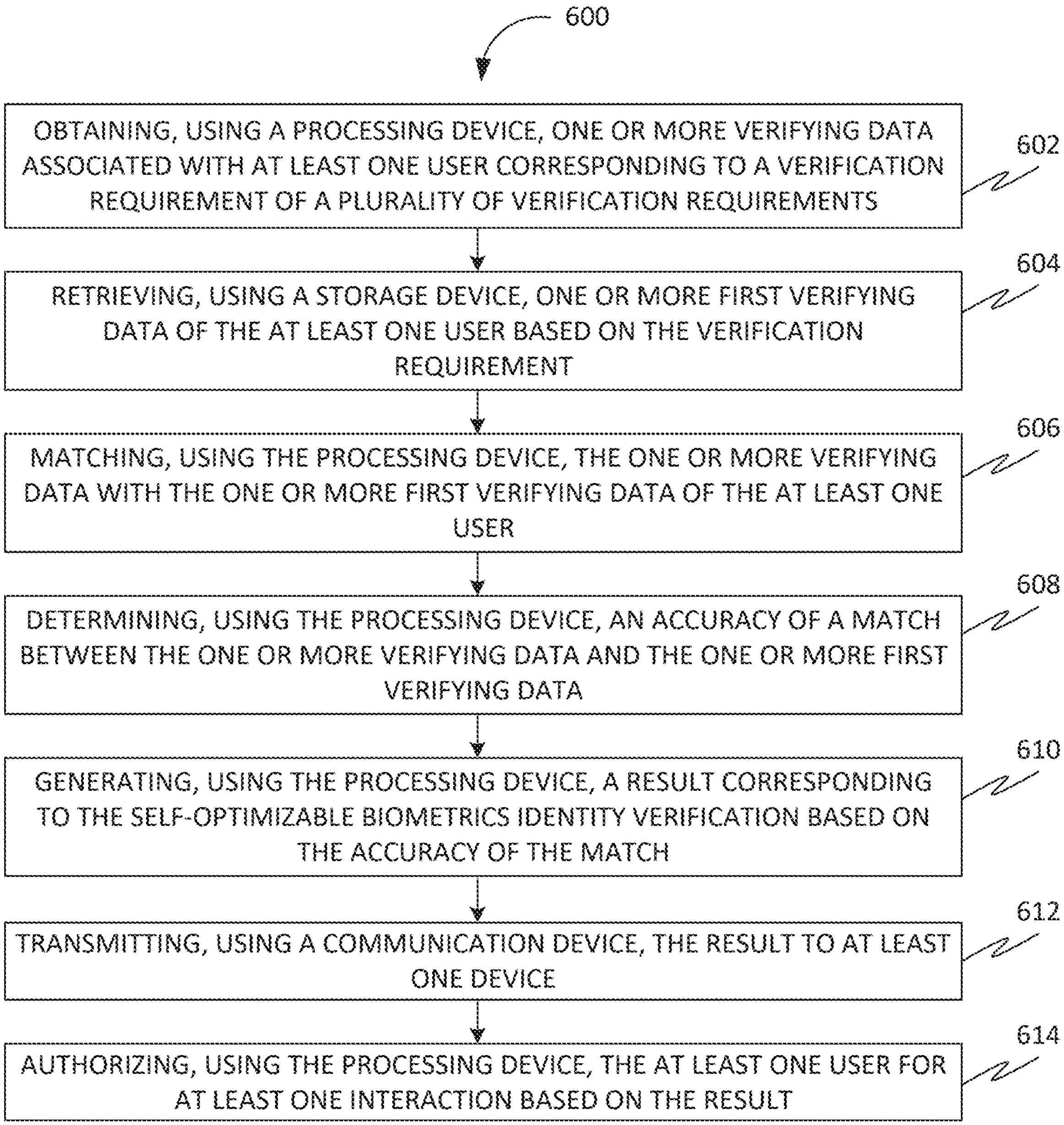
FIG. 6 is a flowchart of a method 600 for facilitating self-optimizable biometrics identity verification of users, in accordance with some embodiments.

FIG. 6 is a flowchart of a method 600 for facilitating self-optimizable biometrics identity verification of users, in accordance with some embodiments. Further, the method 600 may be performed using a supervised learning AI model. Accordingly, at 602 the method 600 may include obtaining, using a processing device, one or more verifying data associated with at least one user for a verification requirement of a plurality of verification requirements. Further, the one or more verifying data associated with the at least one user may include a fingerprint data of the at least one user, a facial data of the at least one user, an iris data of the at least one user, etc. Further, the plurality of verification requirements may include a facial recognition, a fingerprint recognition, an iris recognition, etc.

Further, at 604 the method 600 may include retrieving, using a storage device, one or more first verifying data of the at least one user based on the verification requirement. Further, the one or more first verifying data may include a first fingerprint data collected at a time of registration, a first facial data collected at a time of registration, a first iris data collected at a time of registration, etc.

Further, at 606 the method 600 may include matching, using the processing device, the one or more verifying data with the one or more first verifying data of the at least one user.

Further, at 608 the method 600 may include determining, using the processing device, an accuracy of a match between the one or more verifying data and the one or more first verifying data.

Further, at 610 the method 600 may include generating, using the processing device, a result for the self-optimizable biometrics identity verification based on the accuracy of the match.

Further, at 612 the method 600 may include transmitting, using a communication device, the result to at least one device.

Further, at 614 the method 600 may include authorizing, using the processing device, the at least one user for at least one interaction based on the result. Further, the authorizing may include granting a permission to, for example, but not limited to an online meeting, a webpage, a content, etc.

Figure 7:
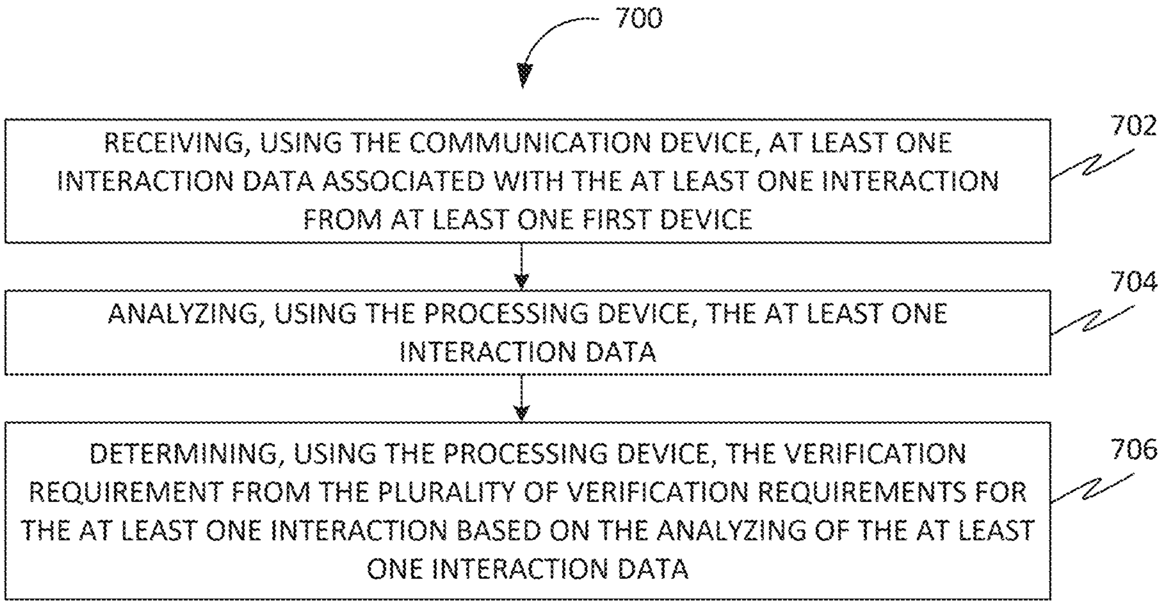
FIG. 7 is a flowchart of a method 700 for facilitating self-optimizable biometrics identity verification of users, in accordance with some embodiments.

FIG. 7 is a flowchart of a method 700 for facilitating self-optimizable biometrics identity verification of users, in accordance with some embodiments. Accordingly, at 702 the method 700 may include receiving, using the communication device, at least one interaction data associated with the at least one interaction from at least one first device. Further, the at least one interaction data may include a login credentials, a name, an email, etc. Further, the at least one interaction may include visiting a webpage, joining an online meeting, etc.

Further, at 704 the method 700 may include analyzing, using the processing device, the at least one interaction data.

Further, at 706 the method 700 may include determining, using the processing device, the verification requirement from the plurality of verification requirements for the at least one interaction based on the analyzing of the at least one interaction data. Further, the obtaining of the one or more verifying data may be based on the determining of the verification requirement.

Further, in an embodiment, each of the plurality of verification requirements corresponds to a number of verification methods from a plurality of verification methods for the self-optimizable biometrics identity verification of the at least one user and a total verification value. Further, the number of verification methods may include a combination of verification methods. Further, the combination of verification methods may include an Iron combination method, using any seven or more verification methods (elements) (total verification value (Total value)>10), a Copper combination method, using any five or six verification methods (elements) (total verification value (Total value)<=10), a Silver combination method, using any three or four verification methods (elements) (total verification value (Total value)<=7.5), and a Gold combination method, using any one or two verification methods (elements) (total verification value (Total value)<=5). Further, in an embodiment, the combination of verification methods may correspond to an iron combination method, a copper combination method, a silver combination method, a gold combination method, etc. Further, the copper combination method may include at least three verification methods. Further, the silver combination method may include n number of verification methods. Further, the n corresponds to n≥2n≥2. Further, the gold combination method may include a second range for the number of verification methods. Further, the range may include n<2n<2. Further, the total verification value may include a mathematical value associated with a precision of the combination of verification methods. Further, the mathematical value associated with the copper combination may be greater than or equal to 10. Further, the mathematical value associated with the silver combination method may include a range. Further, the range may include T≤7.5 T≤7.5. Further, the mathematical value associated with the gold combination method may include a first range. Further, the first range may include T>7.5 T>7.5. Further, the one or more verifying data corresponds to the number of verification methods.

Further, in an embodiment, each of the plurality of verification methods may be characterized by at least one value parameter. Further, the at least one value parameter may include a precision value associated with a False Acceptance Rate, a False Rejection Rate, etc. Further, the precision value may include, for example, very low, low, moderate to low, moderate, moderate to high, high, and very high. Further, the at least one value parameter may be associated with at least one value. Further, the at least one value may include a first mathematical value associated with the precision value of each of the plurality of verification methods. Further, the total verification value for the number of verification methods may be based on the at least one value of the at least one value parameter of the number of verification methods. Further, the determining of the verification requirement may include selecting one or more verification methods from the plurality of verification methods based on the number of verification methods of the verification requirement. Further, the selecting of the one or more verification methods may be based on a correspondence of a summation of the at least one value of the at least one value parameter of the one or more verification methods to the total verification value for the verification requirement. Further, the one or more verifying data corresponds to the one or more verification methods.

Figure 8:
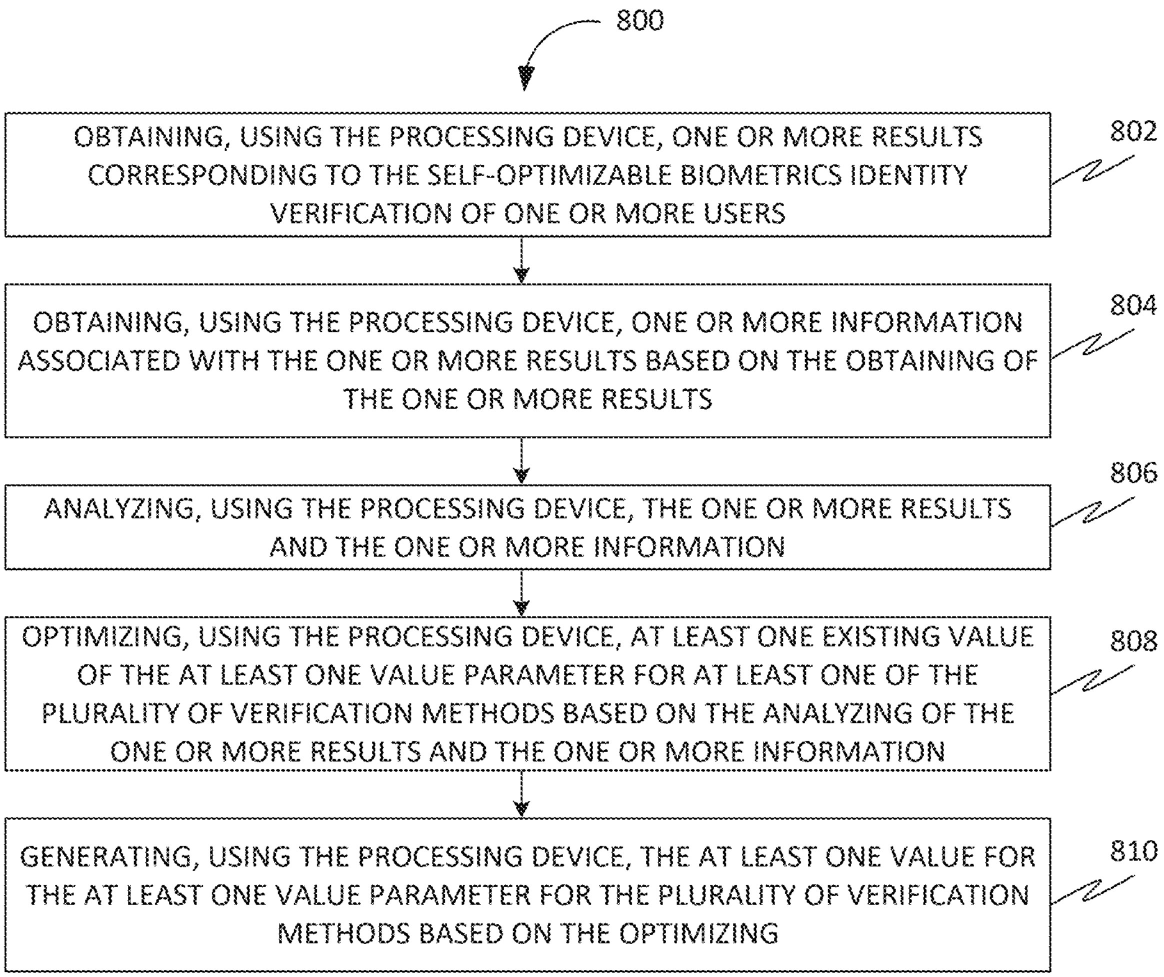
FIG. 8 is a flowchart of a method 800 for facilitating self-optimizable biometrics identity verification of users, in accordance with some embodiments.

FIG. 8 is a flowchart of a method 800 for facilitating self-optimizable biometrics identity verification of users, in accordance with some embodiments. Accordingly, at 802 the method 800 may include obtaining, using the processing device, one or more results for the self-optimizable biometrics identity verification of one or more users. Further, the one or more results may include results associated with the plurality of verification methods.

Further, at 804 the method 800 may include obtaining, using the processing device, one or more information associated with the one or more results based on the obtaining of the one or more results. Further, the one or more information may be associated with at least one of one or more verification methods associated with the one or more results, one or more time periods associated with the one or more results, one or more environmental conditions associated with the one or more results, one or more conditions associated with the one or more results, and one or more statuses associated with the one or more results. Further, the at least one of one or more verification methods may include at least one of facial verification, fingerprint verification, iris verification, etc. Further, the one or more time periods may include time periods associated with the time of registration, a time of authentication, etc. Further, the one or more environmental conditions may include environmental noise, air quality, viewing distance, etc. Further, the one or more conditions may include network type, network noise, etc. Further, the one or more statuses may include at least one status of the result. Further, the at least one status of the result may include a generated result, a pending result, etc.

Further, at 806 the method 800 may include analyzing, using the processing device, the one or more results and the one or more information.

Further, at 808 the method 800 may include optimizing, using the processing device, at least one existing value of the at least one value parameter for at least one of the plurality of verification methods based on the analyzing of the one or more results and the one or more information.

Further, at 810 the method 800 may include generating, using the processing device, the at least one value for the at least one value parameter for the plurality of verification methods based on the optimizing.

Further, in an embodiment, the at least one existing value may be associated with at least one existing weight. Further, the at least one existing weight may include a third mathematical value associated with the at least one existing weight. Further, the optimizing may include verifying the at least one existing weight of the at least one value parameter based on the analyzing of the one or more results and the one or more information. Further, the optimizing may include adjusting the at least one existing weight based on the verifying of the at least one existing weight. Further, the optimizing further may include generating at least one weight of the at least one value parameter. Further, the generating of the at least one value for the at least one value parameter may be further based on the at least one weight.

Figure 9:
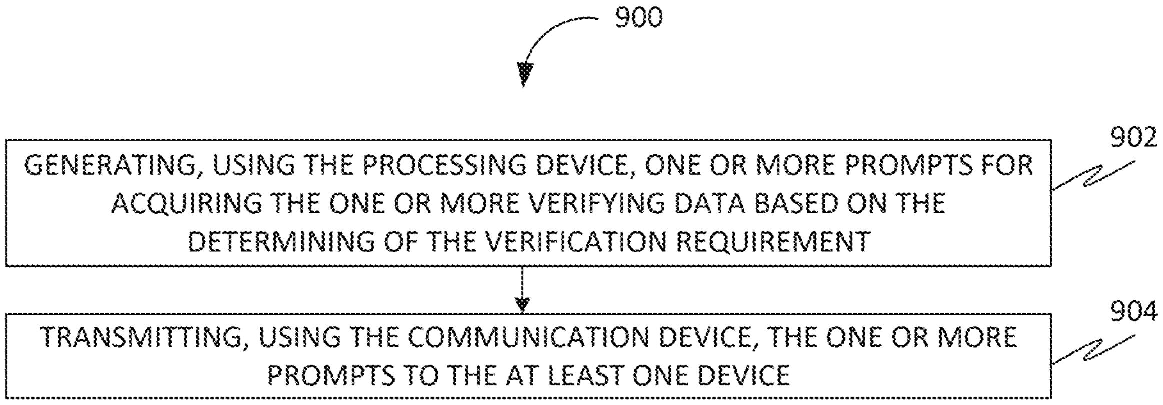
FIG. 9 is a flowchart of a method 900 for facilitating self-optimizable biometrics identity verification of users, in accordance with some embodiments.

FIG. 9 is a flowchart of a method 900 for facilitating self-optimizable biometrics identity verification of users, in accordance with some embodiments. Accordingly, at 902 the method 900 may include generating, using the processing device, one or more prompts for acquiring the one or more verifying data based on the determining of the verification requirement. Further, the one or more prompts may include a text, an audio, a web link, etc. Further, the one or more prompts corresponds to the number of verification methods.

Further, at 904 the method 900 may include transmitting, using the communication device, the one or more prompts to the at least one device. Further, the at least one device may be configured for presenting the one or more prompts to the at least one user. Further, the obtaining of the one or more verifying data may include obtaining the one or more verifying data from the at least one device based on the presenting of the one or more prompts.

Further, in some embodiments, the at least one device may include at least one sensor. Further, the at least one sensor may include an iris scanner, a gait scanner, a fingerprint scanner, a face scanner, etc. Further, the at least one sensor may be configured for detecting one or more verification characteristics of the at least one user. Further, the obtaining of the one or more verifying data may include generating the one or more verifying data based on the detecting of the one or more verification characteristics. Further, the one or more verification characteristics may include a pattern in a fingerprint, a contrast in a face, a color of a retina, etc.

Figure 10:
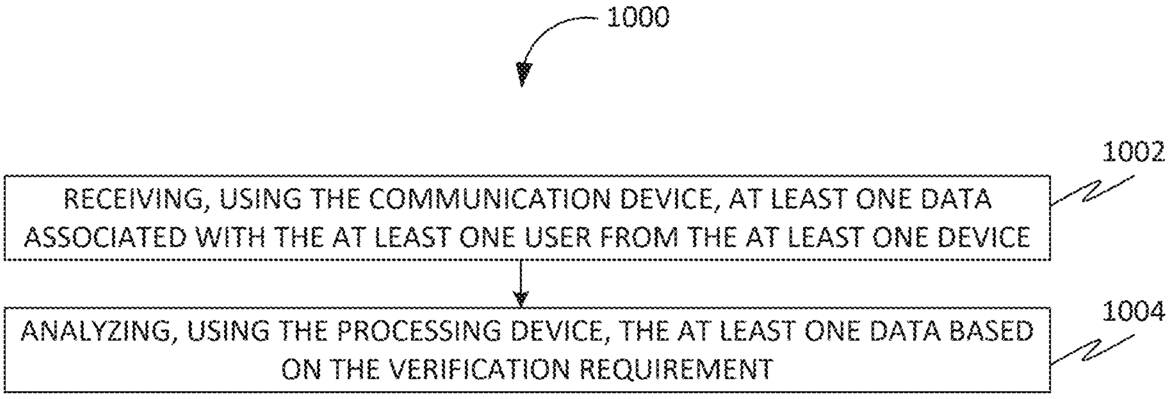
FIG. 10 is a flowchart of a method 1000 for facilitating self-optimizable biometrics identity verification of users, in accordance with some embodiments.

FIG. 10 is a flowchart of a method 1000 for facilitating self-optimizable biometrics identity verification of users, in accordance with some embodiments. Accordingly, at 1002 the method 1000 may include receiving, using the communication device, at least one data associated with the at least one user from the at least one device. Further, the at least one data may include a name, an email, a digital self-optimizable biometrics identity card, etc.

Further, at 1004 the method 1000 may include analyzing, using the processing device, the at least one data based on the verification requirement. Further, the obtaining of the one or more verifying data associated with the at least one user for the verification requirement may be further based on the analyzing of the at least one data.

Further, in some embodiments, the matching of the one or more verifying data with the one or more first verifying data may include analyzing the one or more verifying data using at least one machine learning model. Further, the at least one machine learning model may include a convolutional neural network (CNN), a recurrent neural network (RNN), etc.

Further, the at least one machine learning model may be trained for extracting at least one feature from the one or more verifying data. Further, the at least one feature may include a pattern, a contrast, a color, etc. Further, the matching of the one or more verifying data with the one or more first verifying data may include matching the at least one feature with at least one first feature of the one or more first verifying data using the at least one machine learning model. Further, the at least one first feature may include a first pattern, a first contrast, a first color, etc. Further, the determining of the accuracy of the match may be further based on the matching of the at least one feature with the at least one first feature.

FIG. 11 is a biometric method table 1100 for facilitating self-optimizable biometrics identity verification of users, in accordance with some embodiments. Accordingly, the biometric method table 1100 may comprise a plurality of self-optimizable biometrics identity verification methods with a precision of false acceptance rate (FAR) and a precision of false rejection rate (FRR). Further, the precision may include a plurality of values such as very low, low, moderate to low, moderate, moderate to high, high, very high. Further, the plurality of values may correspond to initial quantitively applied values 1, 2, 2.5, 3, 3.5, 4, and 5 respectively.

Figure 12:
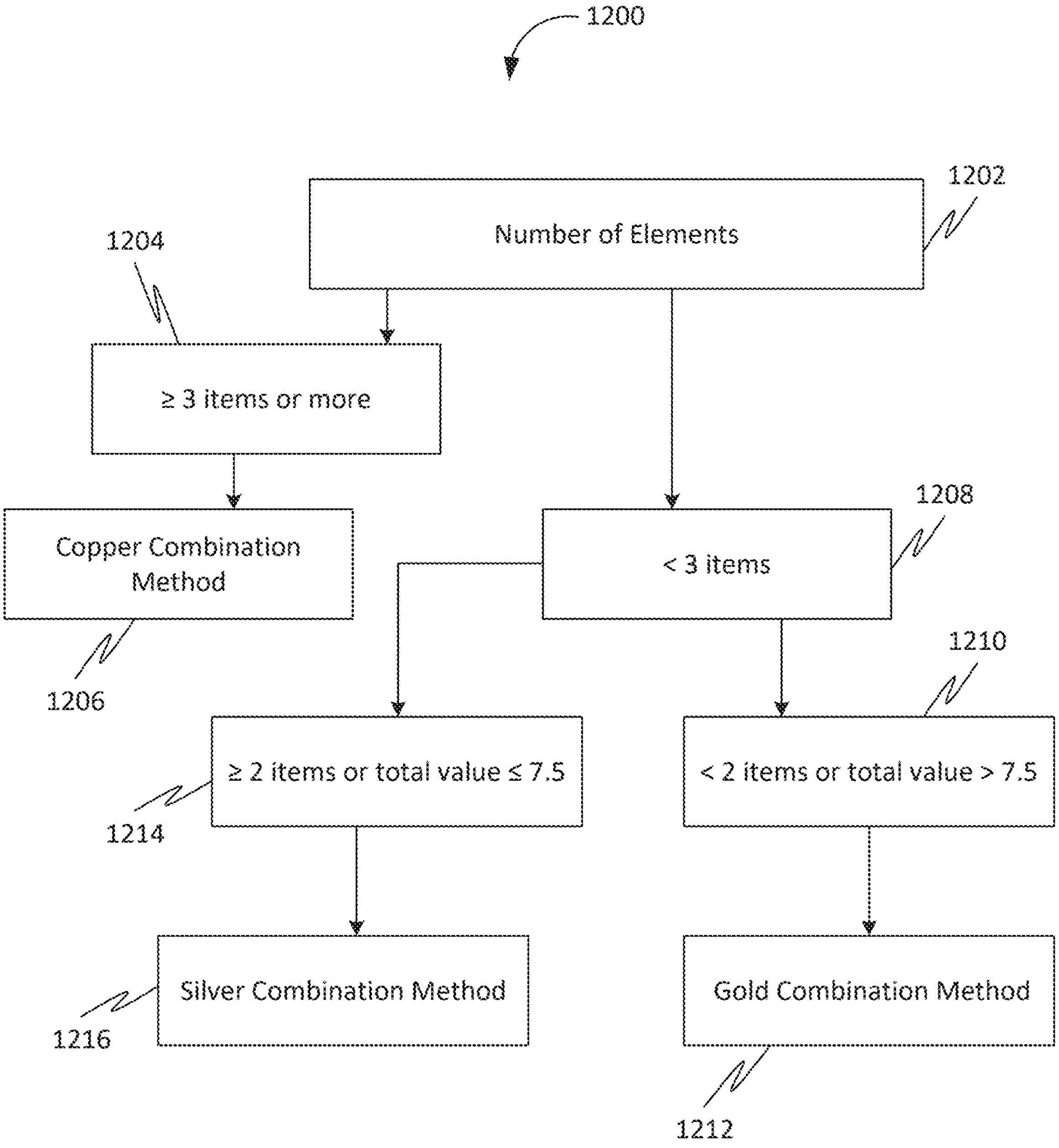
FIG. 12 is a flow diagram of a method 1200 for determining a combination method for facilitating self-optimizable biometrics identity verification of users, in accordance with some embodiments.

FIG. 12 is a flow diagram of a method 1200 for determining a combination method for facilitating self-optimizable biometrics identity verification of users, in accordance with some embodiments. Accordingly, at 1202 the method 1202 may include determining a number of elements. Further, the number of elements may be associated with a number of authentication methods used in the verification.

Further, at 1204 the method 1200 may include determining at least three elements. Further, the at least three elements may correspond to at least three authentication methods, for example, iris scan, fingerprint scan, face scanning, etc.

Further, at 1206 the method 1200 may include a step of determining the combination method based on the at least three elements. Further, the combination method may include a copper combination method.

Further, at 1208, the method 1200 may include determining at most three elements. Further, the at most three elements may correspond to at most three authentication methods, for example, iris scan, fingerprint scan, face scanning, etc.

Further, at 1210, the method 1200 may include determining a number of authentication methods and total value based on the authentication methods. Further, the number of combination methods may include at most two authentication methods. Further, the total value may be at least 7.5.

Further, at 1212, the method 1200 may include determining the combination method. Further, the combination method may include a gold combination method.

Further, at 1214, the method 1200 may include determining the number of authentication methods and total value based on the authentication methods. Further, the number of combination methods may include at least two authentication methods. Further, the total value may be at most 7.5.

Further, at 1216 the method 1200 may include determining the combination method. Further, the combination method may include a silver combination method.

Figure 13:
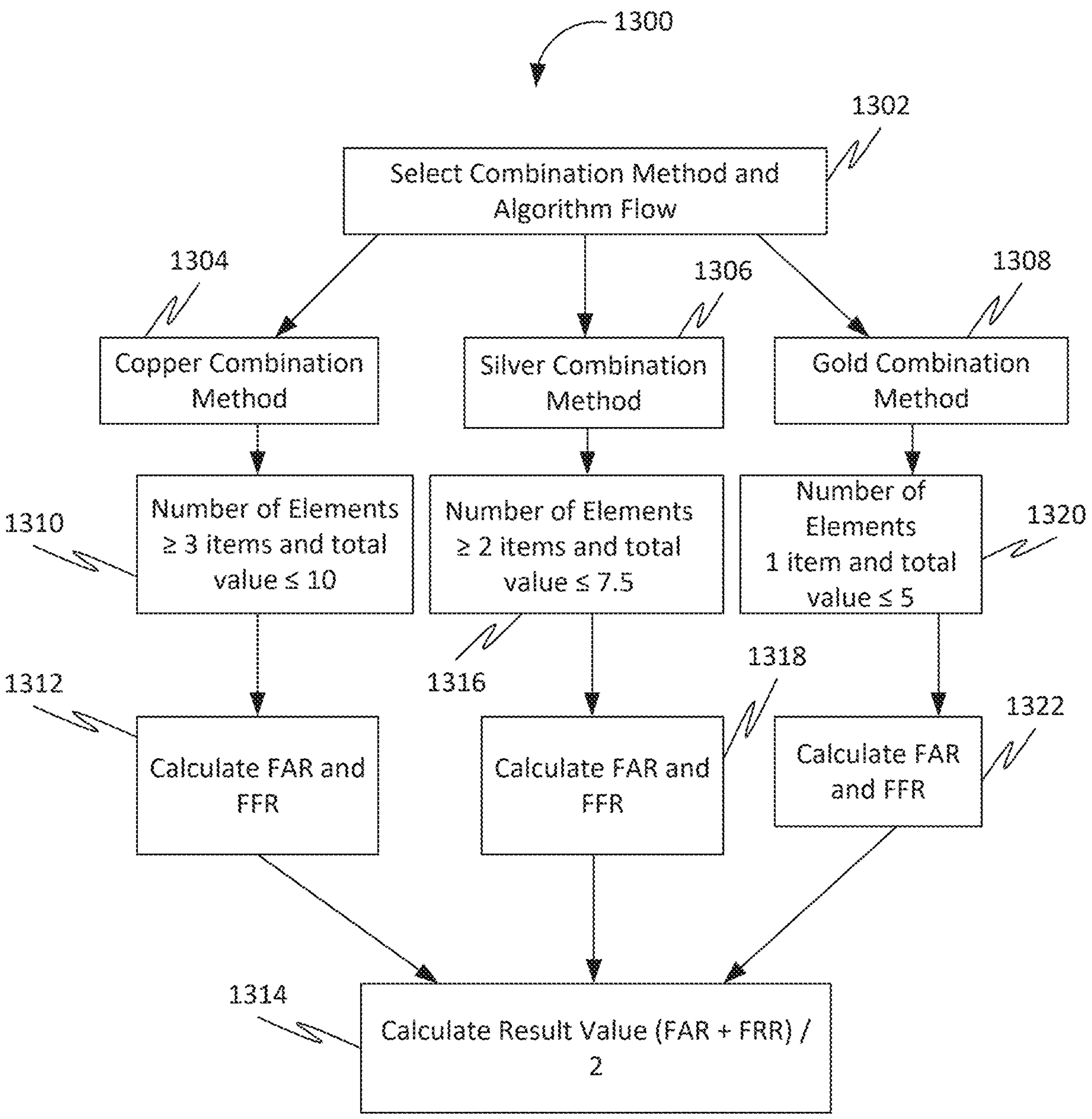
FIG. 13 is a flow diagram of a method 1300 for determining a result value for facilitating self-optimizable biometrics identity verification of users, in accordance with some embodiments.

FIG. 13 is a flow diagram of a method 1300 for determining a result value for facilitating self-optimizable biometrics identity verification of users, in accordance with some embodiments. Accordingly, at 1302 the method 1300 may include determining a combination method.

Further, at 1304, the method 1300 may include selecting a copper combination method.

Further, at 1306, the method 1300 may include selecting a silver combination method.

Further, at 1308, the method 1300 may include selecting a gold combination method. Further, the gold combination method is a default method for algorithms.

Further, at 1310, the method 1300 may include determining a number of elements and total value for the copper combination method. Further, the number of elements may include at most three elements. Further, the at most three elements may correspond to at most three authentication methods, for example, iris scan, fingerprint scan, face scanning, etc. Further, the total value may be at most 10.

Further, at 1312, the method 1300 may include calculating a false acceptance rate (FAR) and false rejection rate (FRR) based on the determining the number of elements and the total value.

Further, at 1314, the method may include calculating the result value based on 1314. Further, the calculating of the result value may include taking an average of the FAR and FRR.

Further, at 1316, the method 1300 may include a step of determining the number of elements and total value associated with the number of elements. Further, the number of elements may include at most three elements. Further, the at most three elements may correspond to at most three authentication methods, for example, iris scan, fingerprint scan, face scanning, etc. Further, the total value may be at most 7.5.

Further, at 1318, the method 1300 may include calculating FAR and FRR based on the number of elements at 1316.

Further, at 1314, the result value is determined based on the calculating of FAR and FRR at 1318.

Further, at 1320, the method 1300 may include determining the number of elements and total value associated with a gold combination method. Further, the number of combination methods may include at most two authentication methods. Further, the total value may be at least 7.5.

Further, at 1322, the method 1300 may include a step of calculating FAR and FRR based on the determining at 1320.

Further, at 1314, the result value is determined based on the calculating of FAR and FRR at 1320.

Figure 14:
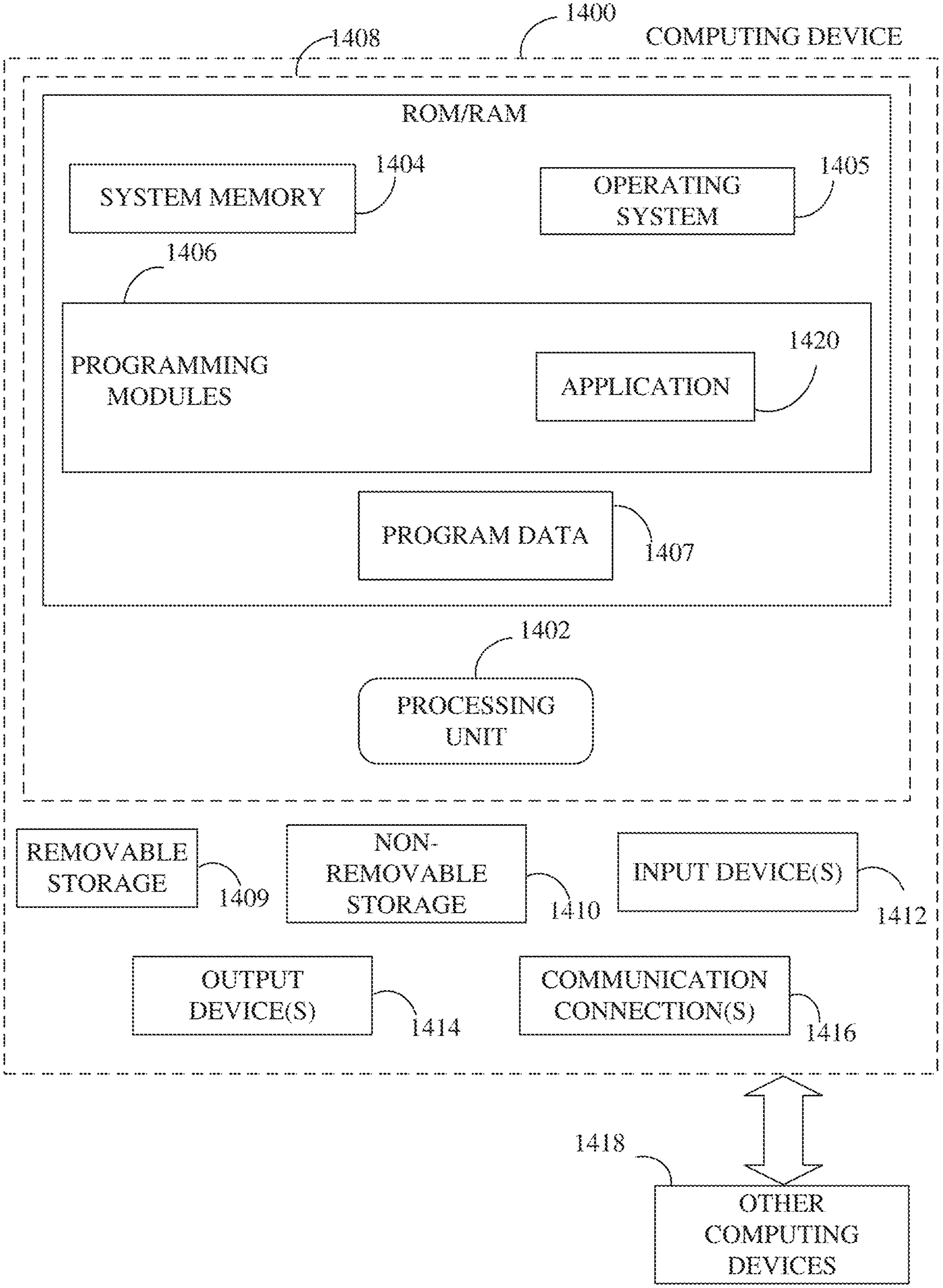
FIG. 14 is a block diagram of a computing device for implementing the methods disclosed herein, in accordance with some embodiments.

With reference to FIG. 14, a system consistent with an embodiment of the disclosure may include a computing device or cloud service, such as computing device 1400. In a basic configuration, computing device 1400 may include at least one processing unit 1402 and a system memory 1404. Depending on the configuration and type of computing device, system memory 1404 may comprise, but is not limited to, volatile (e.g. random-access memory (RAM)), non-volatile (e.g. read-only memory (ROM)), flash memory, or any combination. System memory 1404 may include operating system 1405, one or more programming modules 1406, and may include a program data 1407. Operating system 1405, for example, may be suitable for controlling computing device 1400's operation. In one embodiment, programming modules 1406 may include image-processing modules, machine learning modules, etc. Furthermore, embodiments of the disclosure may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and non-volatile, removable, and non-removable media implemented in any method or technology for storage of information, such as computer-readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD), other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, a location sensor, a camera, a biometric sensor, etc. Output device(s) 1414 such as a display, speakers, a printer, etc. may also be included. The aforementioned devices are examples and others may be used.

Computing device 1400 may also contain a communication connection 1416 that may allow device 1400 to communicate with other computing devices 1418, such as over a network in a distributed computing environment, for example, an intranet or the Internet. Communication connection 1416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1404, including operating system 1405. While executing on processing unit 1402, programming modules 1406 (e.g., application 1420) may perform processes including, for example, one or more stages of methods, algorithms, systems, applications, servers, databases as described above. The aforementioned process is an example, and processing unit 1402 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating self-optimizable biometrics identity verification of users, the method comprising:

obtaining, using a processing device, one or more verifying data associated with at least one user for a verification requirement of a plurality of verification requirements;

retrieving, using a storage device, one or more first verifying data of the at least one user based on the verification requirement;

matching, using the processing device, the one or more verifying data with the one or more first verifying data of the at least one user;

determining, using the processing device, an accuracy of a match between the one or more verifying data and the one or more first verifying data;

generating, using the processing device, a result for the self-optimizable biometrics identity verification based on the accuracy of the match;

transmitting, using a communication device, the result to at least one device;

authorizing, using the processing device, the at least one user for at least one interaction based on the result;

receiving, using the communication device, at least one interaction data associated with the at least one interaction from at least one first device;

analyzing, using the processing device, the at least one interaction data;

determining, using the processing device, the verification requirement from the plurality of verification requirements for the at least one interaction based on the analyzing of the at least one interaction data, wherein the obtaining of the one or more verifying data is based on the determining of the verification requirement;

wherein each of the plurality of verification requirements corresponds to a number of verification methods from a plurality of verification methods for the self-optimizable biometrics identity verification of the at least one user and a total verification value, wherein the one or more verifying data corresponds to the number of verification methods; and wherein each of the plurality of verification methods is characterized by at least one value parameter, wherein the at least one value parameter is associated with at least one value, wherein the total verification value for the number of verification methods is based on the at least one value of the at least one value parameter of the number of verification methods, wherein the determining of the verification requirement comprises selecting one or more verification methods from the plurality of verification methods based on the number of verification methods of the verification requirement, wherein the selecting of the one or more verification methods is further based on a correspondence of a summation of the at least one value of the at least one value parameter of the one or more verification methods to the total verification value for the verification requirement, wherein the one or more verifying data corresponds to the one or more verification methods;

generating, using the processing device, one or more prompts for acquiring the one or more verifying data based on the determining of the verification requirement, wherein the one or more prompts corresponds to the number of verification methods; and transmitting, using the communication device, the one or more prompts to the at least one device, wherein the at least one device is configured for presenting the one or more prompts to the at least one user, wherein the obtaining of the one or more verifying data comprises obtaining the one or more verifying data from the at least one device based on the presenting of the one or more prompts.

2. The method of claim 1 further comprising:

obtaining, using the processing device, one or more results for the self-optimizable biometrics identity verification of one or more users;

obtaining, using the processing device, one or more information associated with the one or more results based on the obtaining of the one or more results, wherein the one or more information is associated with at least one of one or more verification methods associated with the one or more results, one or more time periods associated with the one or more results, one or more environmental conditions associated with the one or more results, one or more conditions associated with the one or more results, and one or more statuses associated with the one or more results;

analyzing, using the processing device, the one or more results and the one or more information;

optimizing, using the processing device, at least one existing value of the at least one value parameter for at least one of the plurality of verification methods based on the analyzing of the one or more results and the one or more information; and generating, using the processing device, the at least one value for the at least one value parameter for the plurality of verification methods based on the optimizing.

3. The method of claim 2, wherein the at least one existing value is associated with at least one existing weight, wherein the optimizing further comprising:

verifying the at least one existing weight of the at least one value parameter based on the analyzing of the one or more results and the one or more information;

adjusting the at least one existing weight based on the verifying of the at least one existing weight; and generating at least one weight of the at least one value parameter, wherein the generating of the at least one value for the at least one value parameter is further based on the at least one weight.

4. The method of claim 1, wherein the at least one device comprises at least one sensor, wherein the at least one sensor is configured for detecting one or more verification characteristics of the at least one user, wherein the obtaining of the one or more verifying data comprises generating the one or more verifying data based on the detecting of the one or more verification characteristics.

5. The method of claim 1 further comprising:

receiving, using the communication device, at least one data associated with the at least one user from the at least one device; and analyzing, using the processing device, the at least one data based on the verification requirement, wherein the obtaining of the one or more verifying data associated with the at least one user for the verification requirement is further based on the analyzing of the at least one data.

6. The method of claim 1, wherein the matching of the one or more verifying data with the one or more first verifying data comprises:

analyzing the one or more verifying data using at least one machine learning model, wherein the at least one machine learning model is trained for extracting at least one feature from the one or more verifying data; and matching the at least one feature with at least one first feature of the one or more first verifying data using the at least one machine learning model, wherein the determining of the accuracy of the match is further based on the matching of the at least one feature with the at least one first feature.

7. A system for facilitating self-optimizable biometrics identity verification of users, the system comprising:

a communication device configured for transmitting a result to at least one device;

a processing device communicatively coupled with the communication device, wherein the processing device is configured for:

obtaining one or more verifying data associated with at least one user for a verification requirement of a plurality of verification requirements;

matching the one or more verifying data with one or more first verifying data of the at least one user;

determining an accuracy of a match between the one or more verifying data and the one or more first verifying data;

generating the result for the self-optimizable biometrics identity verification based on the accuracy of the match; and authorizing the at least one user for at least one interaction based on the result; and a storage device communicatively coupled with the processing device, wherein the storage device is configured for retrieving the one or more first verifying data of the at least one user based on the verification requirement;

the communication device being further configured for receiving at least one interaction data associated with the at least one interaction from at least one first device, wherein the processing device is further configured for;

analyzing the at least one interaction data; and determining the verification requirement from the plurality of verification requirements for the at least one interaction based on the analyzing of the at least one interaction data, wherein the obtaining of the one or more verifying data is based on the determining of the verification requirement;

wherein each of the plurality of verification requirements corresponds to a number of verification methods from a plurality of verification methods for the self-optimizable biometrics identity verification of the at least one user and a total verification value, wherein the one or more verifying data corresponds to the number of verification methods;

wherein each of the plurality of verification methods is characterized by at least one value parameter, wherein the at least one value parameter is associated with at least one value, wherein the total verification value for the number of verification methods is based on the at least one value of the at least one value parameter of the number of verification methods, wherein the determining of the verification requirement comprises selecting one or more verification methods from the plurality of verification methods based on the number of verification methods of the verification requirement, wherein the selecting of the one or more verification methods is further based on a correspondence of a summation of the at least one value of the at least one value parameter of the one or more verification methods to the total verification value for the verification requirement, wherein the one or more verifying data corresponds to the one or more verification methods; and the communication device being further configured for transmitting one or more prompts to the at least one device, wherein the at least one device is configured for presenting the one or more prompts to the at least one user, wherein the obtaining of the one or more verifying data comprises obtaining the one or more verifying data from the at least one device based on the presenting of the one or more prompts, wherein the processing device is further configured for generating one or more prompts for acquiring the one or more verifying data based on the determining of the verification requirement, wherein the one or more prompts corresponds to the number of verification methods.

8. The system of claim 7, wherein the processing device is further configured for:

obtaining one or more results for the self-optimizable biometrics identity verification of one or more users;

obtaining one or more information associated with the one or more results based on the obtaining of the one or more results, wherein the one or more information is associated with at least one of one or more verification methods associated with the one or more results, one or more time periods associated with the one or more results, one or more environmental conditions associated with the one or more results, one or more conditions associated with the one or more results, and one or more statuses associated with the one or more results;

analyzing the one or more results and the one or more information;

optimizing at least one existing value of the at least one value parameter for at least one of the plurality of verification methods based on the analyzing of the one or more results and the one or more information; and generating the at least one value for the at least one value parameter for the plurality of verification methods based on the optimizing.

9. The system of claim 8, wherein the at least one existing value is associated with at least one existing weight, wherein the optimizing further comprising:

verifying the at least one existing weight of the at least one value parameter based on the analyzing of the one or more results and the one or more information;

adjusting the at least one existing weight based on the verifying of the at least one existing weight; and generating at least one weight of the at least one value parameter, wherein the generating of the at least one value for the at least one value parameter is further based on the at least one weight.

10. The system of claim 7, wherein the at least one device comprises at least one sensor, wherein the at least one sensor is configured for detecting one or more verification characteristics of the at least one user, wherein the obtaining of the one or more verifying data comprises generating the one or more verifying data based on the detecting of the one or more verification characteristics.

11. The system of claim 7, wherein the communication device is further configured for receiving at least one data associated with the at least one user from the at least one device, wherein the processing device is further configured for analyzing the at least one data based on the verification requirement, wherein the obtaining of the one or more verifying data associated with the at least one user for the verification requirement is further based on the analyzing of the at least one data.

12. The system of claim 7, wherein the matching of the one or more verifying data with the one or more first verifying data comprises:

analyzing the one or more verifying data using at least one machine learning model, wherein the at least one machine learning model is trained for extracting at least one feature from the one or more verifying data; and matching the at least one feature with at least one first feature of the one or more first verifying data using the at least one machine learning model, wherein the determining of the accuracy of the match is further based on the matching of the at least one feature with the at least one first feature.

* * * * *